United States Patent
Jung et al.

(10) Patent No.: US 11,815,288 B2
(45) Date of Patent: Nov. 14, 2023

(54) HUMIDIFICATION AND AIR CLEANING APPARATUS

(71) Applicant: LG ELECTRONICS INC., Seoul (KR)

(72) Inventors: Jaehyuk Jung, Seoul (KR); Seungdeok Yang, Seoul (KR); Seokho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 17/113,283

(22) Filed: Dec. 7, 2020

(65) Prior Publication Data

US 2021/0172627 A1 Jun. 10, 2021

(30) Foreign Application Priority Data

Dec. 9, 2019 (KR) .......................... 10-2019-0162756

(51) Int. Cl.
*F24F 6/14* (2006.01)
*F24F 110/50* (2018.01)

(52) U.S. Cl.
CPC ............. *F24F 6/14* (2013.01); *F24F 2110/50* (2018.01)

(58) Field of Classification Search
CPC .. F24F 6/14; F24F 2110/50; F24F 8/10; F24F 8/117; F24F 2006/008; F24F 13/20; F24F 6/06; F24F 2006/065; F24F 13/082; F24F 8/108; F24F 8/133; F24F 6/04; F24F 13/075; Y02A 50/20; Y02B 30/54; F04D 29/4226; F04D 17/06; F04D 25/08; F04D 29/444; F04D 29/624; F04D 29/667; F04D 29/705; F05D 2240/12; F05D 2250/52

See application file for complete search history.

(56) References Cited

U.S. PATENT DOCUMENTS

| | | | |
|---|---|---|---|
| 1,994,912 A * | 3/1935 | Hochstetter | B01F 23/21311 261/91 |
| 2,354,466 A * | 7/1944 | Levinsen | F24F 13/08 454/82 |
| 4,050,663 A * | 9/1977 | Rogers | B60R 11/0205 248/316.4 |
| 10,359,204 B2 * | 7/2019 | Son | G01F 23/72 |
| D890,905 S * | 7/2020 | Farone | D23/364 |
| 10,718,535 B2 * | 7/2020 | Son | B01D 46/10 |

(Continued)

FOREIGN PATENT DOCUMENTS

| | | |
|---|---|---|
| CN | 105387549 | 3/2016 |
| CN | 205593106 | 9/2016 |

(Continued)

OTHER PUBLICATIONS

European Search Report dated May 7, 2021 issued in Application No. 20212412.9.

(Continued)

*Primary Examiner* — Stephen Hobson
(74) *Attorney, Agent, or Firm* — KED & ASSOCIATES, LLP

(57) ABSTRACT

A humidification and air cleaning apparatus is provided, in which a shield prevents water, discharged from an upper nozzle, from being scattered upward, thereby preventing droplets from being scattered to a discharge port which is open to as upper side of a water tank.

20 Claims, 20 Drawing Sheets

(56) References Cited

U.S. PATENT DOCUMENTS

| | | | | |
|---|---|---|---|---|
| 11,007,469 B2* | 5/2021 | Jun | ............... | B01D 53/78 |
| 2005/0151280 A1* | 7/2005 | French | ............... | F24F 6/043 |
| | | | | 261/104 |
| 2006/0021718 A1* | 2/2006 | Franssen | ............... | E06B 9/266 |
| | | | | 160/178.1 R |
| 2006/0163754 A1* | 7/2006 | Barthelson | ............... | F24F 6/16 |
| | | | | 261/30 |
| 2009/0270024 A1* | 10/2009 | Buck | ............... | F24F 13/082 |
| | | | | 209/280 |
| 2010/0081371 A1* | 4/2010 | Dinicolas | ............... | F24F 13/20 |
| | | | | 454/275 |
| 2011/0139005 A1* | 6/2011 | Kwon | ............... | F24F 8/133 |
| | | | | 95/224 |
| 2012/0031509 A1* | 2/2012 | Wallace | ............... | F04D 25/08 |
| | | | | 137/338 |
| 2014/0326794 A1* | 11/2014 | Frank | ............... | F24F 11/523 |
| | | | | 236/51 |
| 2015/0054181 A1* | 2/2015 | Martin | ............... | F24F 5/0035 |
| | | | | 261/28 |
| 2015/0115481 A1* | 4/2015 | Jang | ............... | F24F 6/06 |
| | | | | 261/24 |
| 2016/0201939 A1* | 7/2016 | Jonas | ............... | F24F 13/082 |
| | | | | 454/309 |
| 2017/0120182 A1* | 5/2017 | Kim | ............... | F24F 11/30 |
| 2017/0122587 A1* | 5/2017 | Son | ............... | B01F 23/2132 |
| 2017/0122600 A1* | 5/2017 | Son | ............... | B01F 23/21 |
| 2017/0353914 A1* | 12/2017 | Jung | ............... | H04W 48/18 |
| 2018/0147523 A1* | 5/2018 | Oh | ............... | B01D 47/025 |
| 2018/0313556 A1* | 11/2018 | Seo | ............... | H02J 50/15 |
| 2018/0335228 A1* | 11/2018 | Brown | ............... | F04D 29/403 |
| 2019/0039009 A1* | 2/2019 | Jun | ............... | F24F 13/28 |
| 2019/0107302 A1* | 4/2019 | Liu | ............... | F24F 3/044 |
| 2019/0170162 A1* | 6/2019 | Jennings | ............... | F04D 19/002 |

FOREIGN PATENT DOCUMENTS

| | | |
|---|---|---|
| CN | 108744814 | 11/2018 |
| CN | 109210662 | 1/2019 |
| CN | 110410980 | 11/2019 |
| DE | 1454601 | 4/1971 |
| EP | 3179174 | 6/2017 |
| JP | 2018-532094 | 11/2018 |
| KR | 10-2017-0051233 | 5/2017 |
| WO | WO 2014/019434 | 2/2014 |

OTHER PUBLICATIONS

Chinese Office Action dated May 6, 2022 issued in Application No. 202011441533.5 (English translation attached).

* cited by examiner

HUMIDIFICATION AND AIR CLEANING APPARATUS

CROSS-REFERENCE TO RELATED APPLICATION(S)

This application claims priority under 35 U.S.C. § 119 to Korean Application No. 10-2019-0162756, filed in Korea on Dec. 9, 2019, whose entire disclosure is hereby incorporated by reference.

BACKGROUND

1. Field

A humidification and air cleaning apparatus is disclosed herein.

2. Background

Air conditioning apparatuses include air conditioners that control a temperature of air, air cleaners that remove foreign substances from air to maintain air cleanliness, humidifiers that increase humidity in the air, and dehumidifiers that reduce humidity in the air. Typical humidifiers are classified into a vibration type, which atomizes water on a vibrating plate and discharges it into air, and a natural evaporation type which evaporates water in a humidification filter.

The natural evaporation type humidifier is classified into a disc type humidifier, which rotates a disc using a drive force and allows water to naturally evaporate from the surface of the disc in the air, and a humidification filter type humidifier which allows water to naturally evaporate from a wet humidification medium by flowing air.

Korean Laid-Open Patent Publication No. 10-2017-0051233 (hereinafter referred to as the "related art document"), which is hereby incorporated by reference, discloses an apparatus for both humidification and air cleaning. In the humidification and air cleaning apparatus disclosed in the related art document, humidification housing sprays water by rotating in a water tank. However, the related art document has a problem in that when the humidification housing rotates while spraying water, if a volume of air to be discharged upward increases, droplets sprayed from the humidification housing may also be scattered along with the air to the outside of a discharge port of the water tank.

BRIEF DESCRIPTION OF THE DRAWINGS

Embodiments will be described in detail with reference to the following drawings in which like reference numerals refer to like elements, and wherein.

DETAILED DESCRIPTION

Figure 1:
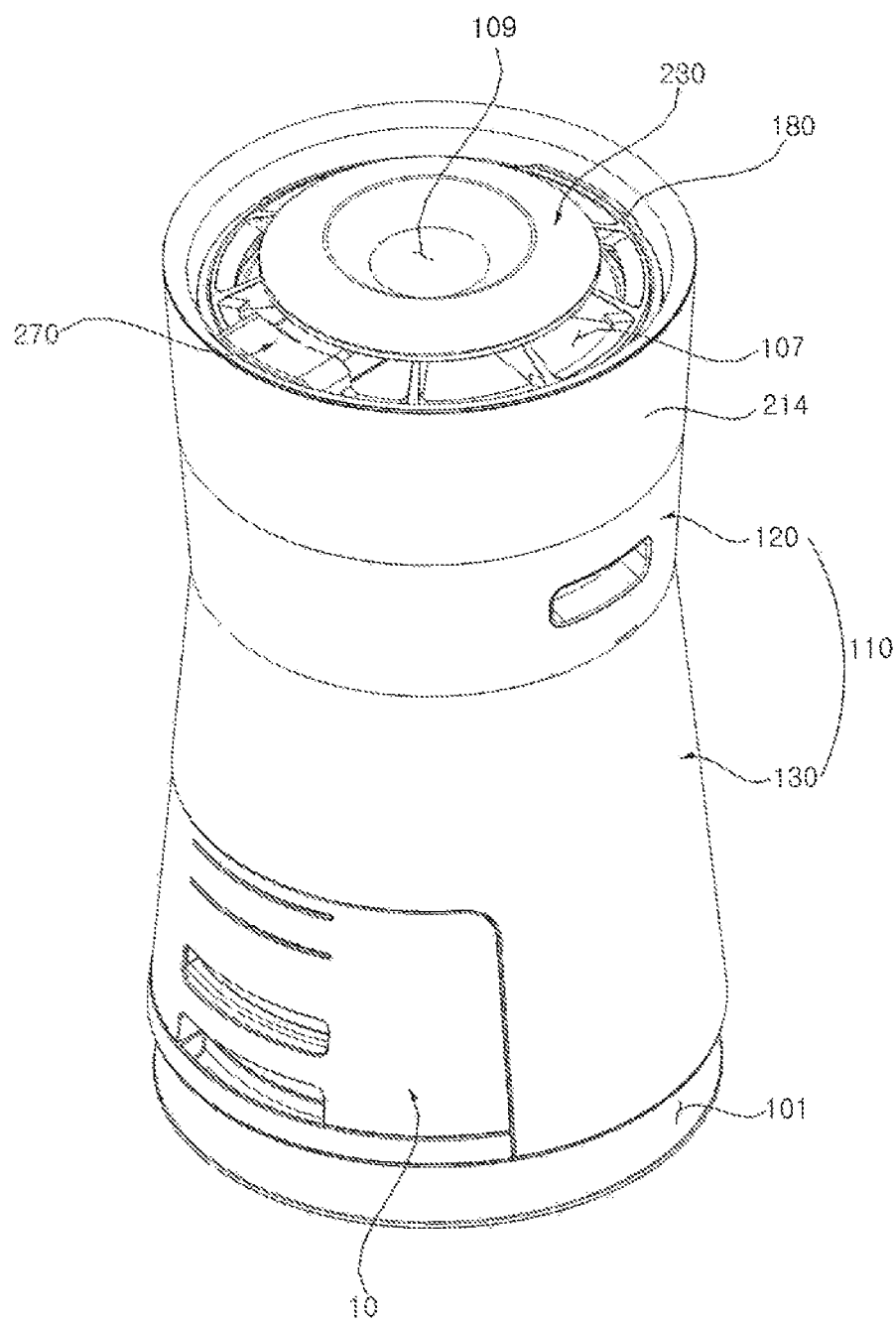
FIG. 1 is a perspective view of a humidification and air cleaning apparatus according to an embodiment.

Advantages and features of embodiments and methods of accomplishing the same will be more clearly understood from embodiments described below with reference to the accompanying drawings. However, the embodiments are not limited to the following embodiments but may be implemented in various different forms. The embodiments are provided only to complete disclosure and to fully provide a person having ordinary skill in the art to which embodiments pertains with the category, and embodiments will be defined by the scope of the appended claims. Wherever possible, like reference numerals generally denote like elements through the specification.

Hereinafter, embodiments will be described with reference to the accompanying drawings.

Figure 2:
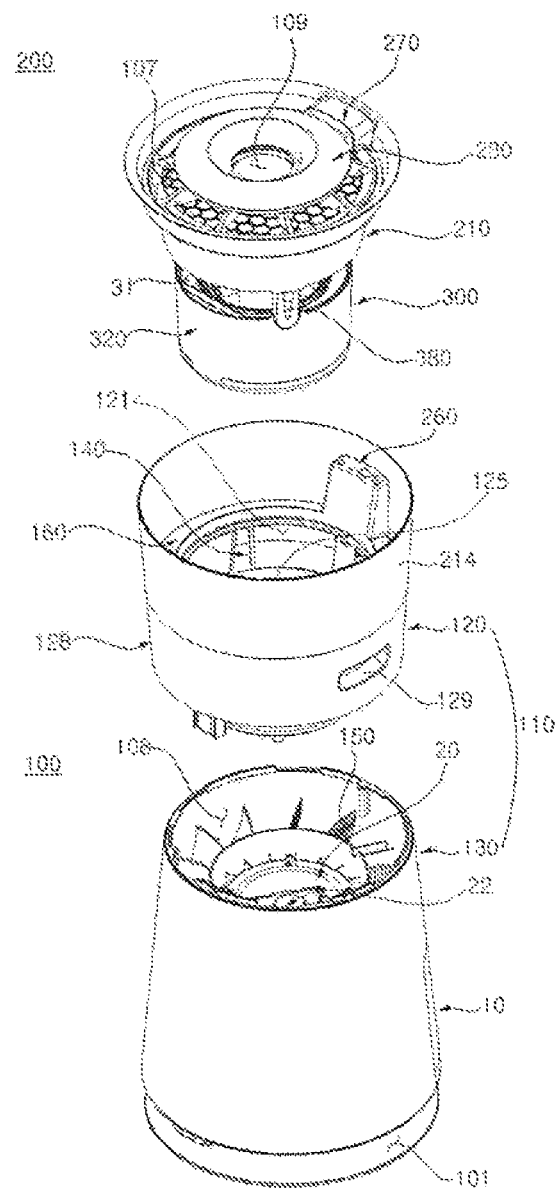
FIG. 2 is an exploded perspective view of the humidification and air cleaning apparatus of FIG. 1.
Figure 3:
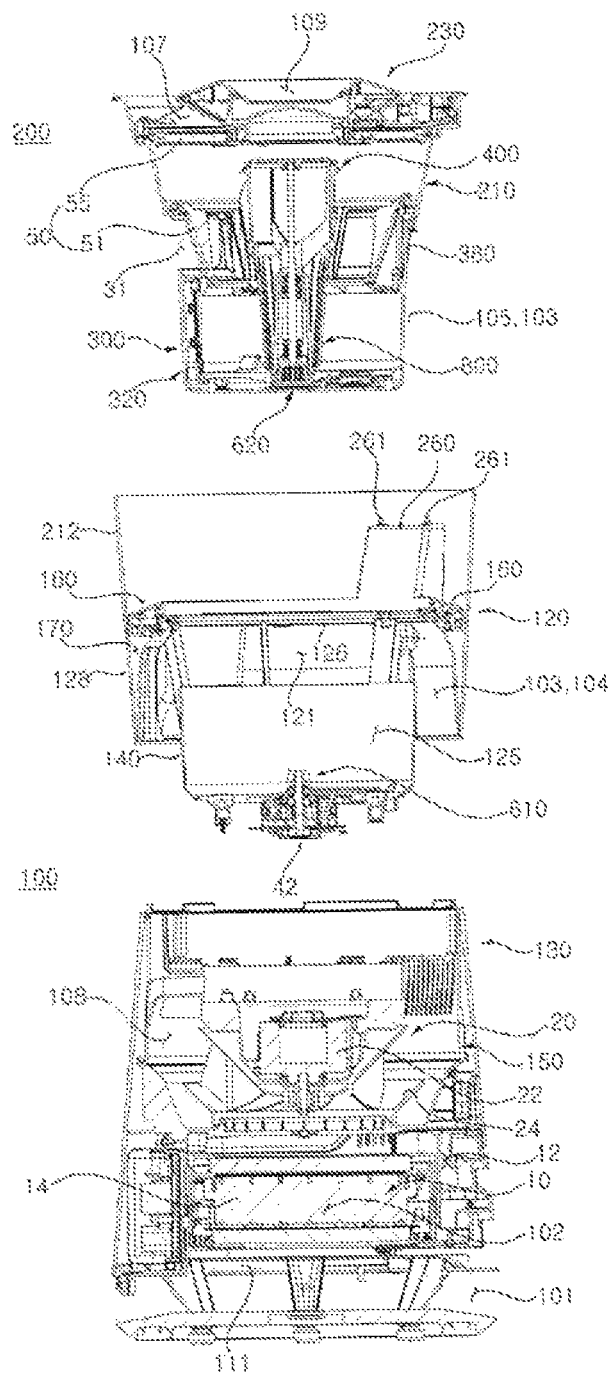
FIG. 3 is a front cross-sectional view of the humidification and air cleaning apparatus of FIG. 2.

FIG. 1 is a perspective view of a humidification and air cleaning apparatus according to an embodiment. FIG. 2 is an exploded perspective view of the humidification and air cleaning apparatus of FIG. 1. FIG. 3 is a front cross-sectional view of the humidification and air cleaning apparatus of FIG. 2.

Referring to FIGS. 1 to 3, an humidification and air cleaning apparatus according to this embodiment may include an air cleaning module 100 and an air humidification module 200 located over the air cleaning module 100.

The air cleaning module 100 may take in and filter external air, and may provide the filtered air to the air humidification module 200. The air humidification module 200 may be supplied with the filtered air, may humidify the filtered air to provide moisture, and may discharge the humidified air to the outside.

The air humidification module 200 may include a water tank 300 that stores water. The water tank 300 may be separated from the air clean module 100 along with the air humidification module 200 when the air humidification module 200 is separated from the air cleaning module 100.

The air humidification module 200 is detachably located over the air cleaning module 100.

A user may upwardly separate the air humidification module 200 upward from the air clean module 100, and may easily clean the separated air humidification module 200. Further, the user may clean the interior of the air cleaning module 100, from which the air humidification module 200 is separated. When the air humidification module 200 is separated, a top surface of the air cleaning module 100 is open to the user.

The air cleaning module 100 includes a filter assembly 10, which will be described hereinafter, and the user may clean the air cleaning module 100 after separating the filter assembly 10 from a base body 110.

The user may supply water into the air humidification module 200. The air humidification module 200 has a water supply passage 109, through which water may be supplied from the outside to the water tank 300.

The water supply passage 109 may be formed separately from a discharge passage 107, through which air is discharged. Air to be discharged may be discharged through the discharge passage 107, and the discharge of air through the water supply passage 109 may be minimized or blocked.

The water supply passage 109 may be formed such that water may be supplied into the water tank 300 at any time. For example, even when the air humidification module 200 is in operation, water may be supplied through the water supply passage 109. For example, even when the air humidification module 200 is coupled to the air cleaning module 100, water may be supplied through the water supply passage 109. For example, even when the air humidification module 200 is separated from the air cleaning module 100, water may be supplied through the water supply passage 109. When water is supplied from above through the water supply passage 109, the water supplied from above may flow into the water tank 300 through the water supply passage 109.

The air cleaning module 100 and the air humidification module 200 may be connected to each other by a connection passage 103. As the air humidification module 200 is separable, the connection passage 103 may be distributedly provided over the air cleaning module 100 and the air humidification module 200. It is when the air humidification module 200 is placed over the air cleaning module 100 that a flow passage of the air humidification module 200 and a flow passage of the air cleaning module 100 communicate with each other through the connection passage 103.

The connection passage formed at the air cleaning module 100 may be defined as a cleaning connection passage 104, and the connection passage formed at the air humidification module 200 is defined as a humidification connection passage 105.

The air cleaning module 100 and the air humidification module 200 will be described hereinafter.

The air cleaning module 100 may include base body 110, filter assembly 10 disposed in the base body 110 and filtering air, and an air blower unit (air blower) 20 disposed in the base body 110 and blowing air. The base body 110 may include an upper body 120 and a lower body 130. The upper body 120 may be stacked on top of the lower body 130, and the upper body 120 and the lower body 130 may be assembled to each other.

Air may flow into the base body 110. An intake passage 101 may be disposed at a lower side of the lower body 130, and a filtering passage 102 may be disposed inside of the lower body 130, and an air flow passage 108 may be disposed at an upper side of the lower body 130.

In order to form the intake passage 101, a lower body supporter 190 may be disposed to support the lower body 130 from below. The filtering passage 102 may be disposed in the lower body 130 and pass through the filter assembly 10.

The air flow passage 108 may be disposed at an upper side of the air blower unit 20. The filtered air, discharged from the air blower unit 20, may flow into the water tank 300 through an air humidification inlet 31.

The filter assembly 10 may be detachably assembled to the base body 110. The filter assembly 10 includes the filtering passage 102, and filters outside air. The filter assembly 10 may be detached from the base body 10 in a horizontal direction. The filter assembly 10 may be disposed to intersect a flow direction of air that flows upstream in the vertical direction. The filter assembly 10 may slide in the horizontal direction and may filter air that flows upstream in the vertical direction. The filter assembly 10 may be disposed in the horizontal direction and may form the filtering passage 102 in the vertical direction. The filter assembly 10 may slide in the horizontal direction with respect to the base body 110.

The air blower unit 20 may be disposed above the filter assembly 10. The air blower unit 20 generates an air flow. The air blower unit 20 may be disposed inside of the base body 110 and may allow air to flow from a lower side to an upper side.

The air blower unit 20 may include a blower housing 150, a blower motor 22, and a blower fan (not shown). In this embodiment, the blower motor 22 may be disposed at an upper side of the air blower unit 20, and the blower fan may be disposed at a lower side thereof. A motor shaft of the blower motor 22 may be disposed to face downward and may be coupled to the blower fan.

The blower housing 150 may be disposed inside of the base body 110. The blower housing 150 may provide a passage for flowing air. The blower motor 22 and the blower fan may be disposed in the blower housing 150.

The blower housing 150 may be disposed above the filter assembly 10 and below the upper body 120. The blower housing 150 may have the air flow passage 108 formed therein. The blower fan may be disposed in the air flow passage 108. The air flow passage 108 may connect the filtering passage 102 and the cleaning connection passage 104.

An operating mechanism of the blower fan may be similar to a centrifugal fan, but a discharge direction of the blower fan may be inclined upward. In this embodiment, the blower fan draws in air from below, and then discharges the air outwardly and upwardly in a radial direction. An outer end of the blower fan may be disposed to be directed upward in the radial direction.

The blower motor 22 may be disposed above the blower fan to minimize contact with the flowing air. The blower motor 22 may be installed so as to be covered by the blower fan. The blower motor 22 is not located in the air flow passage formed by the blower fan, and does not generate resistance to the air blown by the blower fan.

The upper body 120 may form an exterior of the base body 110, and may be assembled to the upper side of the lower body 130. The air humidification module 200 may be detachably held in the upper body 120.

The upper body 120 may include an upper outer body 128 forming an exterior of the base body 110 and coupled to the lower body 130; an upper inner body 140 disposed inside of the upper outer body 128, having the water tank 300 inserted therein, and providing the connection passage 103; and an air guide 170 that connects the upper inner body 140 and the upper outer body 128 and guides air to the water tank 170. A water tank insertion space 125 may be formed inside of the upper inner body 140, and the water tank 300 of the air humidification module 200 may be detachably inserted into the water tank insertion space 125.

An outer side of the upper inner body 140 may communicate with the air flow passage 108. The upper inner body 140 may have an upper inlet 121 that passes through the inside and the outside of the upper inner body 140, and corresponding to the air humidification inlet 31. The air humidification inlet 31 may be disposed inside of the upper inlet 121.

The upper inlet 121 and the air humidification inlet 31 may allow the inside of the water tank 300 and the air flow passage 108 to communicate with each other. The upper inner body 140 has the water tank insertion space 125 so that the water tank 300 may be inserted therein.

As the upper body 120 is disposed to separate the connection passage 103 and the water tank insertion space 125, it is possible to minimize a flow of water in the water tank 300 into the connection passage 103. More particularly, the connection passage 103, divided by the upper inner body 140, may be disposed outside of a space in which water is stored, such that it is possible to prevent water from flowing into the connection passage 103.

The upper inner body 140 may have an open upper side, through which the water tank 300 may be inserted. The upper inner body 140 may form a portion of the cleaning connection passage 104, into which the filtered air may flow.

The upper inner body 140 may have the upper inlet 121 corresponding to the air humidification inlet 31. The upper inlet 121 is not an essential component, and may have any shape as long as the upper body 120 to expose the air humidification inlet 31 to the connection passage 103.

The air guide 170 may guide air, supplied through the cleaning connection passage 104, to the upper inlet 121. The air guide 170 may collect air inwardly which rises along the outside of the base body 110. The air guide 170 may change a flow direction of air flowing from a lower side to an upper side. While changing the flow direction of air, the air guide 170 may minimize an angle of change of the flow direction, so as to minimize flow resistance of air.

The air guide 170 may cover 360 degrees of the outside of the upper inner body 140 along a circumference of the upper inner body 140. The air guide 170 may guide air to the water tank 300 in all 360 degrees of directions of the circumference of the water tank 300. The air guide 170 may collect air inwardly which is guided along the outside of the lower body 130, and may supply the collected air to the water tank 300. With this structure, a flow rate of air supplied to the water tank 300 may be sufficiently secured.

A handle 129 may be formed at the upper body 120. As the air humidification module 200 is held in the upper body 120, the whole humidification and air cleaning apparatus may be lifted up by the handle 129.

The cleaning connection passage (not shown) may be disposed on the outside of the upper inlet 121, and the water tank insertion space 125 may be disposed on the inside thereof. The air, flowing through the cleaning connection passage 104, may pass through the upper inlet 121. When the water tank 300 is held in the water tank insertion space 125, the filtered air, having passed through the upper inlet 121, may flow into the water tank 300.

An outer visual body 214 may be coupled to an upper side of the upper body 120. The outer visual body 214 is a component of a visual body 210, but in this embodiment, the outer visual body 214 is fixed to the upper body 120. Alternatively, the outer visual body 214 may also be fixed to the air humidification module 200. Further, alternatively, the outer visual body 214 may be omitted.

The outer visual body 214 may be fixed to the upper body 120. In this embodiment, the outer visual body 214 may be coupled to the upper outer body 128. The outer visual body 214 and the outer surface of the upper outer body 128 may form a continuous surface.

The outer visual body 214 may be formed of a material, allowing a user to see inside of the outer visual body 214. The outer visual body 214 may be formed of a transparent or translucent material, for example.

A display module (display) 160 may be disposed at at least one of the air cleaning module 100 or the air humidification module 200 to display an operating state to a user. In this embodiment, the display module 160 may be disposed at the base body 110 to display an operating state of the humidification and air cleaning apparatus to a user.

The display module 160 may be disposed on an inner surface the outer visual body 214. The display module 160 may be disposed to be closely adhered to an inner surface of the outer visual body 214. When viewed from a top, the display module 160 may have a donut shape. The water tank 300 may be inserted into the display module 160.

The display module 160 may be supported by the outer visual body 214. An inner edge of the display module 160 may be supported by an upper inner body ring 126. The display module 160 may be integrally formed with a base connector 260. An inside of the display module 160 may be supported by the upper inner body 140, and the outside thereof may be supported by the outer visual body 218.

In this embodiment, when viewed from the top, the display module 160 has a ring shape. Alternatively, the display module 160 may have an arc shape. A surface of the display module 160 may be formed of, or coated with, a light-reflective material.

Accordingly, when drops of water are formed on the visual body 210, the water drops formed on the visual body 210 may be projected onto or reflected from the surface of the display module 160. When the water drops formed on the visual body 210 flow downward, a same effect is also shown on the display module 160. This effect may give a visual stimulus to a user, such that the user may intuitively recognize that humidification is being performed. The water drop image projected on the display module 160 may have not only an emotional effect of giving a sense of refreshment to a user, but also a functional effect of informing the user of a humidification state.

The display module 160 may have an inclined upper surface. The display module 160 may be inclined toward a user, such that a height of the display module 160 is higher on the inside than on the outside.

The humidification connection passage 105 may be disposed outside of a side wall of the water tank 300. The cleaning connection passage 104 may be disposed outside of the upper inner body 150.

Hereinafter, each component of the air humidification module 200 will be described with reference to FIG. 2 or FIG. 3.

The air humidification module 200 may include water tank 300 that stores water for humidification and detachably disposed on the air cleaning module 100; a water dispensing unit (dispenser) 400 disposed in the water tank 300 and spraying water in the water tank 300; a humidification medium 50 wetted with water sprayed from the water dispensing unit 400 and providing moisture to the flowing air; visual body 210 coupled to the water tank 300 and formed of a transparent material allowing a user to see the inside thereof; a top cover assembly (top cover) 230 detachably disposed over the visual body 210 and providing the discharge passage 107, through which air is discharged, and the water supply passage 109 through which water is supplied; and a discharge vane 1400 disposed below the top cover assembly 230 and covering the discharge passage 107.

The air humidification module 200 provides humidification to the filtered air. The air humidification module 200 may implement a rain view inside of the water tank 300. The air humidification module 200 may spray and circulate water stored in the water tank 300. The air humidification module 200 may change the stored water into small droplets, and the scattered droplets may come into contact with the filtered air. Humidification and filtering may be performed while the filtered air is humidified with the scattered droplets.

The air humidification module 200 may include the water tank 300, the water dispensing unit 400, the humidification medium 50, the visual body 210, the top cover assembly 230, and handle 180. The handle 180 may be connected to the visual body 210, rotate in the visual body 210, and be held in the visual body 210. A user may simply lift up only the air humidification module 200 by the handle 180, and the handle 180 may be separated from the air cleaning module 100.

In the humidification and air cleaning apparatus according to this embodiment, a power source may be connected to the air cleaning module 100, and the air humidification module 200 may be supplied with power from the air cleaning module 100. As the air humidification module 200 may be separated from the air cleaning module 100, a separate power supply structure may be provided in which power is provided separately to the air cleaning module 100 and the air humidification module 200.

The air cleaning module 100 and the air humidification module 200 may be detachably assembled in the upper body 120, such that the base connector 260 for providing power to the air humidification module 200 may be disposed in the upper body 120. An operation module 240, which requires power, may be disposed at the top cover assembly 230 of the air humidification module 200. A top connector 270, detachably connected to the base connector 260, may be disposed in the air humidification module 200. The top connector 270 may be disposed in the top cover assembly 230.

In this embodiment, the top cover assembly 230 may be separated such that the inner surface of the visual body 210 or the inner surface of the water tank 300 may be cleaned in a convenient manner. The top cover assembly 230 may be detachably installed to the visual body 210. The top cover assembly 230 may be provided with the top connector 270 which may be electrically connected to the base connector 260.

When the top cover assembly 230 is placed on the visual body 210, the top connector 270 is disposed over the base connector 260. The top cover assembly 230 is supplied with electricity from the base connector 260 via the top connector 270.

A water level display unit (display) 247 that displays a water level of the water tank 300 may be disposed near the water supply passage 109. Accordingly, while supplying water, a user may check the water level of the water tank 300 which is not visible. By providing the water level display unit 247 at a position visible to a user while the user supplies water, it is possible to prevent excessive supply of water by the user or prevent overflow of water from the water tank 30.

The water level display unit 247 may be disposed at the top cover assembly 230. A separate power supply structure of the top connector 270 and the base connector 260 may allow effective supply of water from above.

The water tank 300 may be detachably disposed in the upper body 120. The water dispensing unit 400 may be disposed and rotate inside of the water tank 300.

The water tank 300 may include a water tank body 320 in which water is stored; the air humidification inlet 31 formed to pass through a side wall of the water tank body 320; and a water tank body extension part or portion (extension) 380 that extends upward from the water tank body 320 and coupled to the visual body 210.

The water tank body 320 has a bottom surface and a side wall, with an open upper part or portion (opening). The air humidification inlet 31 may pass through the side wall. In this embodiment, the water tank body 320 is formed in a cylindrical shape with an open upper portion. Alternatively, the water tank body 320 may be formed in various shapes.

The water tank body extension 380 may extend upward from the water tank 300. The water tank body extension 380 may form the air humidification inlet 31. The air humidification inlet 31 may be formed between the water tank body extensions 380.

The air humidification inlet 31 may pass through the side surface of the water tank body 320. The air humidification inlet 31 may be formed in all 360 degrees of directions of a circumference of the water tank body 320.

The water tank body extension 380 may guide water, flowing down from the inner surface of the visual body 210, into the water tank 300. By guiding water flowing down from the visual body 210, noise of dropping water may be minimized. The water tank body extension 380 may be coupled to a lower end of the visual body 210.

In this embodiment, the visual body 210 and the water tank 300 are manufactured separately and assembled afterwards. Alternatively, the visual body 210 and the water tank 300 may be integrally formed or the water tank 300 may be included in the visual body 210 as a component. For example, a portion of the water tank 300 may be formed of a transparent material by bi-injection molding, in which case the visual body 210 is not manufactured as a separate component.

In this embodiment, the air humidification inlet 31 is formed as a component of the water tank body 320. Alternatively, the air humidification inlet 31 may also be formed by providing the water tank body extension 380 in the visual body 210.

Further, alternatively, the air humidification inlet 31 may be formed in such a manner that some of a plurality of water tank body extensions 380 are disposed in the water tank 380 and the other are disposed in the visual body 210. In addition, alternatively, the air humidification inlet 31 may be formed as a separate component which is distinguished from the visual body 210 and the water tank 300. Moreover, alternatively, the visual body 210 may have an apertured surface, on which the air humidification inlet 31 may be formed, and the water tank 300 may also have an apertured surface on which the air humidification inlet 31 may be formed.

That is, the air humidification inlet 31 may be formed on either the water tank 300 or the visual body 210. The air humidification inlet 31 may be formed by coupling of the water tank 300 and the visual body 210. Upon providing the air humidification inlet 31 as a component which is distinguished from the water tank 300 and the visual body 210, the component may be disposed between the water tank 300 and the visual body 210. The air humidification inlet 31 may be formed by the coupling of the water tank 300 and the visual body 210.

The visual body 210 may have an upper part or portion and a lower part or portion which is open. When viewed from the top, the open upper portion and the open lower portion of the visual body 210 may have a circular shape. A diameter of the lower opening of the visual body 210 may be smaller than a diameter of the upper opening of the visual body 210.

In this embodiment, the top cover assembly 230 is inserted through the upper opening of the visual body 210, and is detachably disposed on the inner surface of the visual body 210.

The water dispensing unit 400 has a function of supplying water to the humidification medium 50. The water dispensing unit 400 has a function of visualizing the humidification process. The water dispensing unit 400 implements a rain view inside of the air humidification module 200.

The water dispensing unit 400 may draw in water stored in the water tank 300 by rotating humidification housing 800, pump upward the drawn water, and spray the pumped water outwardly in the radial direction. The water dispensing unit 400 may include the humidification housing 800 which draws in water, pumps upward the drawn water, and then sprays the pumped water outwardly in the radial direction.

In this embodiment, the humidification housing 800 may rotate to spray water. Alternatively, a nozzle may be used instead of the humidification housing 800 to spray water. As water is sprayed from the nozzle, the water may be supplied to the humidification medium 50 and a rain view may also be similarly implemented. Depending on embodiments, water may be sprayed from the nozzle or the nozzle may rotate.

The water sprayed from the humidification housing 800 serves to wet the humidification medium 50. The water sprayed from the humidification housing 800 may be sprayed toward at least either the visual body 210 or the humidification medium 50.

Water sprayed toward the visual body 210 may be used to implement a rain view. Water sprayed toward the humidification medium 50 may be used to humidify the filtered air. The rain view may be implemented by spraying water toward the visual body 210, and then water flowing down from the visual body 210 may be used to wet the humidification medium 50.

In this embodiment, a plurality of nozzles having different heights may be provided for the humidification housing 800. Water discharged from any one of the nozzles may form droplets on the inner surface of the visual body 210 to create a rain view, and water discharged from the other nozzle may wet the humidification medium 50 for use in humidification.

The humidification housing 800 may spray water to the inner surface of the visual body 210, and the sprayed water may flow down along the inner surface of the visual body 210. Droplets, shown in the form of drops of water, may be formed on the inner surface of the visual body 210, and a user may see the droplets through the visual body 210.

More particularly, water flowing down from the visual body 210 may wet the humidification medium 50 for use in humidification. The humidification medium 50 may be wetted with water sprayed from the humidification housing 800 and water flowing down from the visual body 210.

The visual body 210 may be coupled to the water tank 300, and may be disposed above the water tank 300. At least a portion of the visual body 210 may be formed of a material allowing a user to see the inside thereof.

The display module 160 may be disposed outside of the visual body 210. The display module 160 may be coupled to either one of the visual body 210 or the upper body 120.

The display module 160 may be disposed at a position at which the rain view may be observed by a user. In this embodiment, the display module 160 may be disposed at the upper body 120.

When the air humidification module 200 is placed on the visual body 210, an outer surface of the visual body 210 is closely adhered to the display module 160. At least a portion of the surface of the display module 160 may be formed of or coated with a light-reflective material.

The droplets formed on the visual body 210 may also be projected onto the surface of the display module 160. Accordingly, a user may observe motion of droplets at both the visual body 210 and the display module 160.

The water tank 300 may have the air humidification inlet 31 through which air passes. The air humidification inlet 31 may be provided between the connection passage 103 and a humidification passage 106. The air humidification inlet 31 may be an outlet of the connection passage 103 and an inlet of the humidification passage 106.

The filtered air, supplied from the air cleaning module 100, may flow into the air humidification module 200 (water tank in this embodiment) through the air humidification inlet 31. The humidification medium 50 may be disposed at the air humidification inlet 31 and may cover the air humidification inlet 31.

The humidification medium 50 may be disposed at at least one of the following positions: on a same plane as the air humidification inlet 31, or on the outside or the inside of the air humidification inlet 31. The humidification medium 50 is wetted with water for humidification, such that the humidification medium 50 is desirably disposed inside the air humidification inlet 31. That is, the humidification medium 50 is desirably disposed on the inside of the water tank 300.

Water flowing down after wetting the humidification medium 50 is stored in the water tank 300. The humidification medium 50 humidifies the filtered air passing through the air humidification inlet 31.

The filtered air is humidified by water naturally evaporated from the humidification medium 50. The term "natural evaporation" means that water evaporates in a state in which separate heat is not applied to the water. Natural evaporation may be promoted as contact with air increases, a flow velocity of air increases, and a pressure in the air decreases. Natural evaporation may also be referred to as "natural vaporization".

The humidification medium 50 may promote the natural evaporation of water. In this embodiment, the humidification medium 50 is wetted with water but is not immersed in the water tank 300.

The humidification medium 50 may be spaced apart from the water stored in the water tank 300, such that even when water is stored in the water tank 300, the humidification medium 50 is not always in a wet state. That is, the humidification medium 50 may be in a wet state only during operation of a humidification mode, and during operation of an air cleaning mode, the humidification medium 50 may be maintained in a dry state.

The humidification medium 50 may cover the air humidification inlet 31, and the filtered air may pass through the humidification medium 50 to flow into the water tank 300. As the filtered air passes through the air humidification inlet 31, an air flow length may be minimized.

Figure 4:
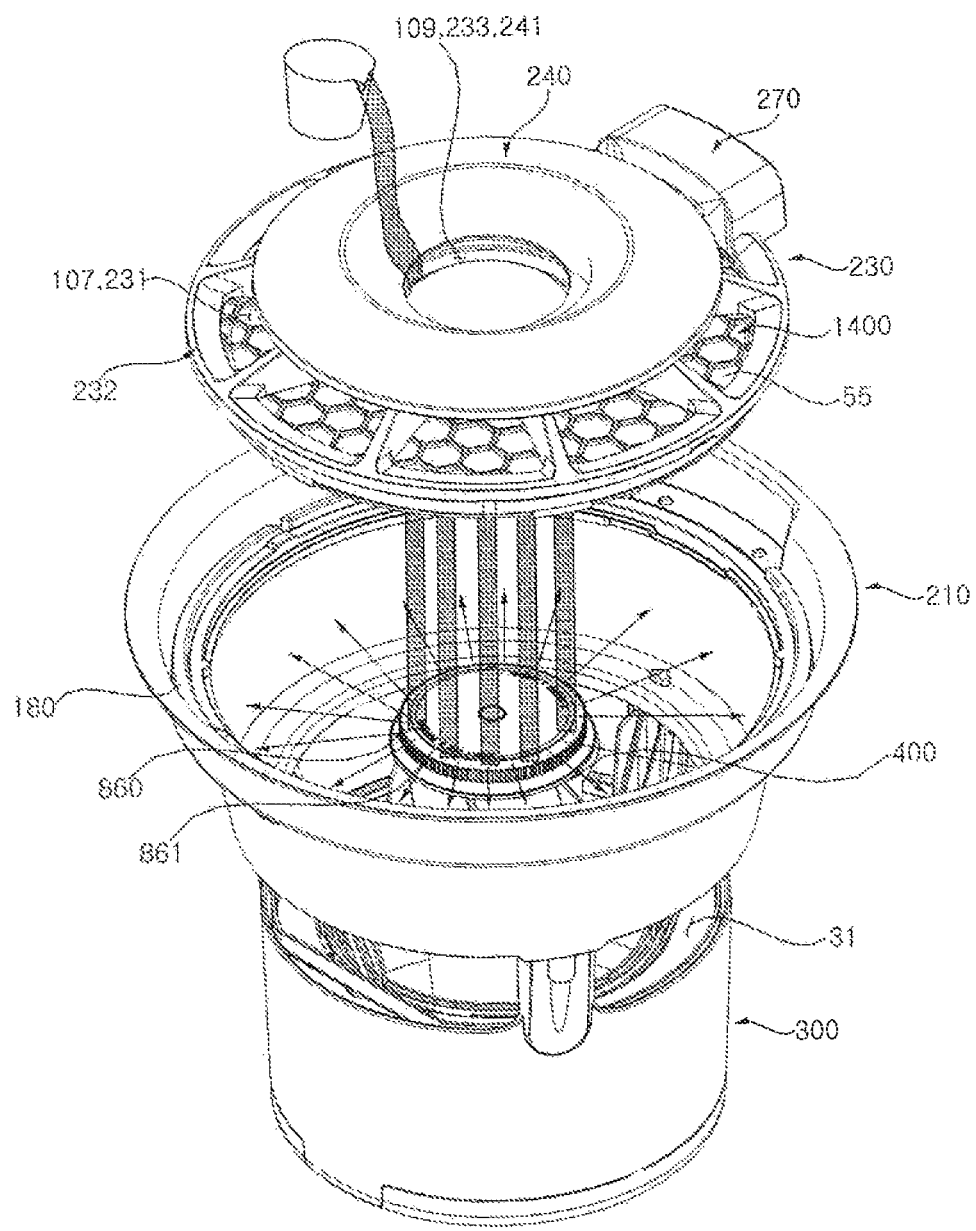
FIG. 4 is a perspective view of an air humidification module of FIG. 2, from which a top cover assembly is separated.
Figure 5:
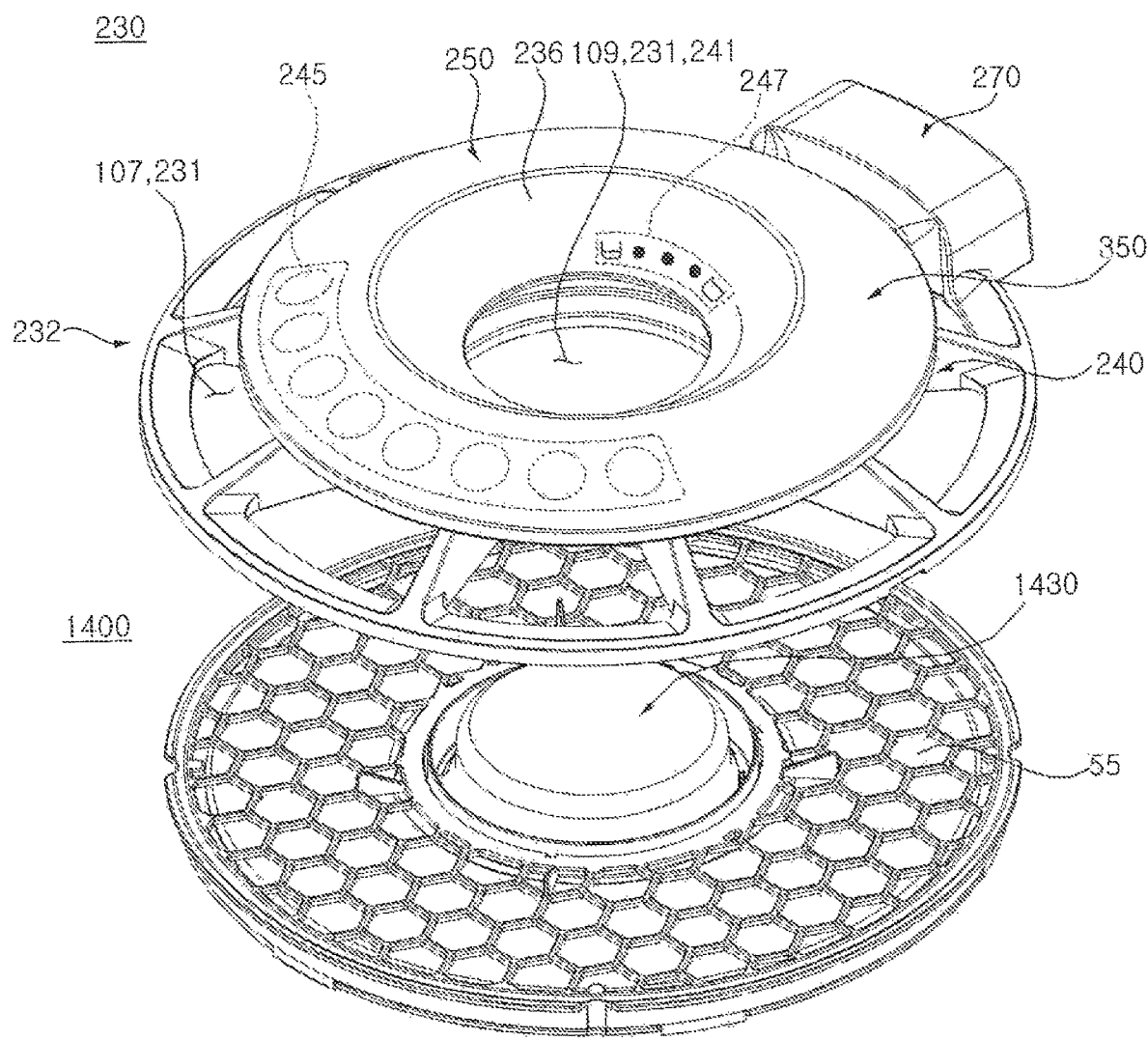
FIG. 5 is an isolated perspective view of the top cover assembly and a discharge humidification medium housing of FIG. 4.

FIG. 4 is a perspective view of an air humidification module of FIG. 2, from which a top cover assembly is separated. FIG. 5 is an isolated perspective view of the top cover assembly and a discharge humidification medium housing of FIG. 4.

The top cover assembly 230 may be detachably placed over the visual body 210. The top cover assembly 230 may provide not only the discharge passage 107, but also the water supply passage 109 for supplying water.

The top cover assembly 230 may be disposed over the discharge humidification medium 55. The humidification medium 55 may be disposed in a discharge humidification medium housing 1400, and the top cover assembly 230 may be disposed over the discharge humidification medium housing 1400.

The discharge humidification medium housing 1400 may be detachably placed over the visual body 210. The top cover assembly 230 may be detachably placed over the discharge humidification medium housing 1400. The top cover assembly 230 may be integrally assembled with the discharge humidification medium housing 1400. The top cover assembly 230 and the discharge humidification medium housing 1400 may be manufactured separately.

The top cover assembly 230 may be detachably placed on the visual body 210 and supported by an inner surface of the visual body 210. The top cover assembly 230 does not apply a load to the discharge humidification medium housing 1400. The discharge humidification medium housing 1400 may be separately placed on the inner surface of the visual body 210.

The discharge humidification medium housing 1400 may have the discharge humidification medium 55 located therein, and cover an upper side of the visual body 210. The water supply passage 109 may pass through the discharge humidification medium housing 1400.

The top cover assembly 230 may include a top cover grill 232 forming the discharge passage 107 and the water supply passage 109; an operation module 240 installed at the top cover grill 232; and top connector 270 providing power or signals to the operation module 240. The top cover grill 232 may include a grill discharge port 231, forming at least a portion of the discharge passage 107, and a grill water supply port 233 forming at least a portion of the water supply passage 109. The grill discharge port 231 and the grill water supply port 233 may be open in a vertical direction. The grill water supply port 233 may be disposed at a center on an inside of the top cover grill 232, and the grill discharge port 231 may be disposed outside of the grill water supply port 232.

The top cover grill 232 may be detachably placed on the visual body 210. The top cover grill 232 may be placed on the inner surface of the visual body 210.

The operation module 240 may be coupled to the top cover grill 232. The operation module 240 may receive control signals from a user. The operation module 240 may transmit water level information to a user. The water supply passage 109 may be disposed in the operation module 240. The operation module 240 may be electrically connected to the top connector 270, and may be supplied with power from the top connector 270.

The operation module 240 may include an operation housing 250 coupled to the discharge grill 232 and having at least a portion of the water supply passage 109 formed therein, an input unit (input) 245 disposed on the operation housing 250, water level display unit 247 disposed on the operation housing 250, and an operation controller (not shown) controlling the input unit 245 and the water level display unit 247.

The water supply passage 109 may be formed in the operation module 240. A portion of the water supply passage 109 may be vertically formed at a center of the operation module 240. An operation water supply port 241, forming at least a portion of the water supply passage 109, may be formed in the operation module 240. The operation water supply port 241 may be disposed inside of the operation housing 250, and may be open in a vertical direction.

The operation module 240 may further include an upper water supply guide 236. The upper water supply guide 236 may guide water, supplied from above, into the operation water supply port 241. A portion of the surface of the operation housing 250 may be inclined to form the upper water supply guide 236.

When supplying water from above, a user may not see the level of water inside of the water tank 300, but may immediately check a rising level of water through the water level display unit 247 disposed near the operation water supply port 241. By checking the water level while supplying water from above, the user may adjust an amount of water supplied from above.

The water supplied from above may fall into the humidification passage 106 by passing through the discharge humidification medium housing 1400. More particularly, the water supplied from above may fall down to the top surface of the humidification housing 800 without directly falling down to a water surface in the water tank 300.

When water is supplied from above while the humidification housing 800 rotates, the supplied water falls down to the humidification housing 800 and is scattered by the humidification housing 800 which rotates, thereby separately creating a rain view. That is, the rain view may be created using water sprayed by the water dispensing unit 400, as well as the water supplied from above.

Figure 6:
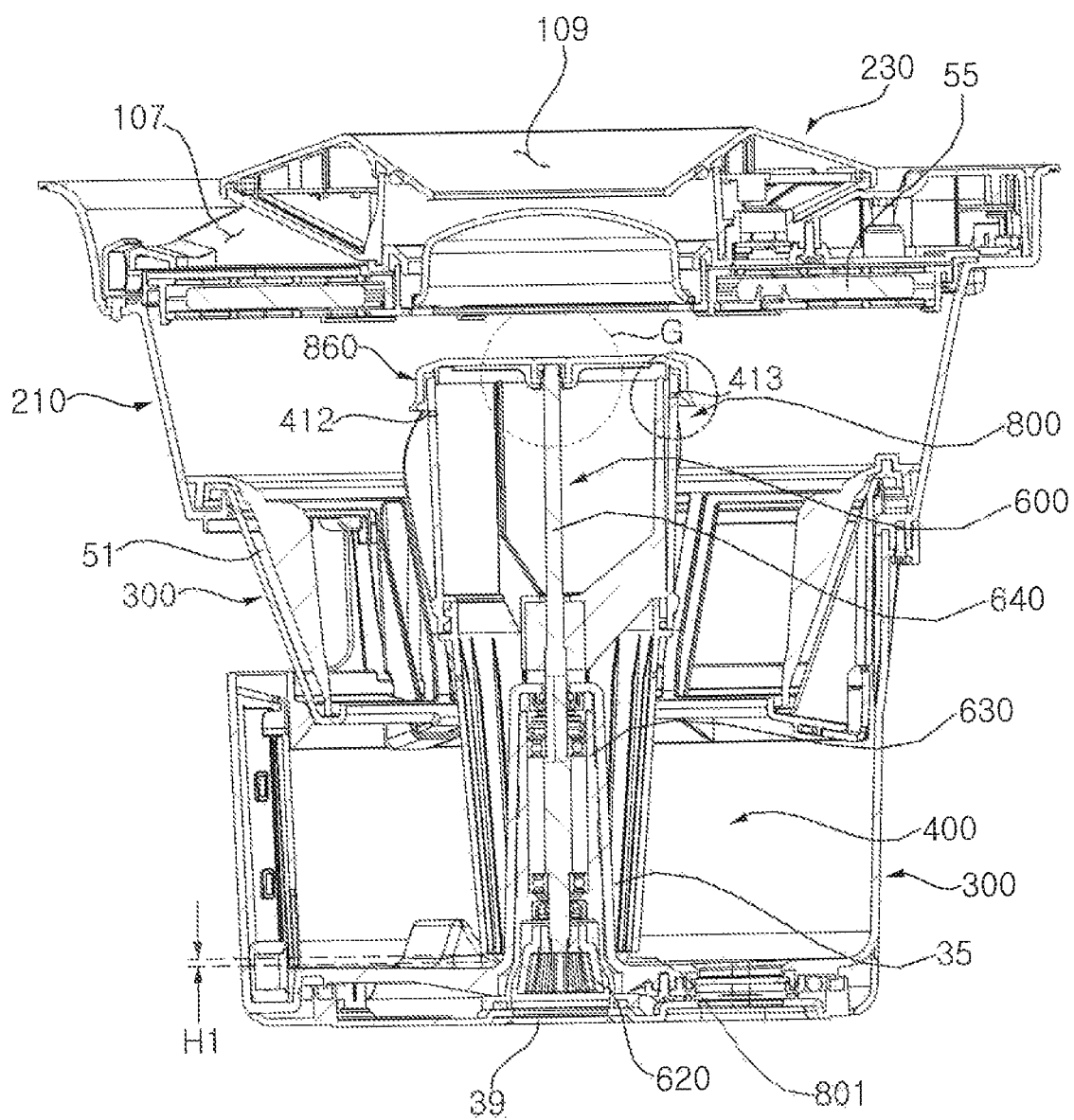
FIG. 6 is a cross-sectional view of the air humidification module of FIG. 4.
Figure 7:
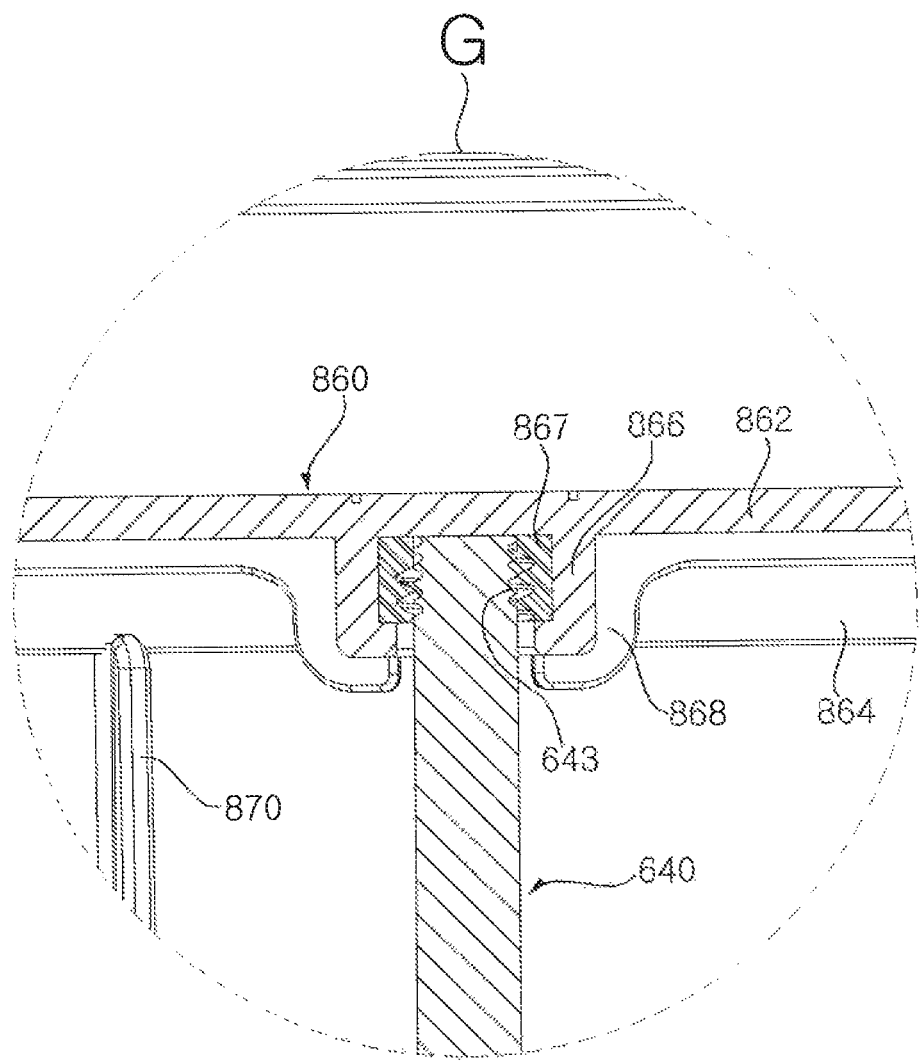
FIG. 7 is a magnified view of a portion G of FIG. 6.
Figure 8:
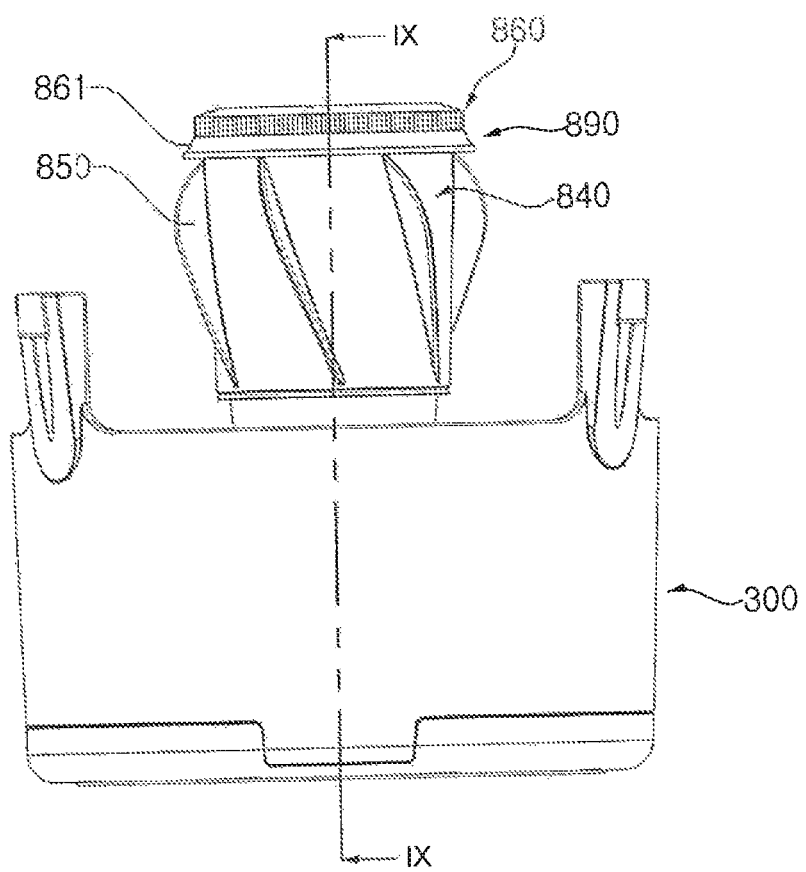
FIG. 8 is a front view illustrating an installation state of a humidification housing of FIG. 4.
Figure 9:
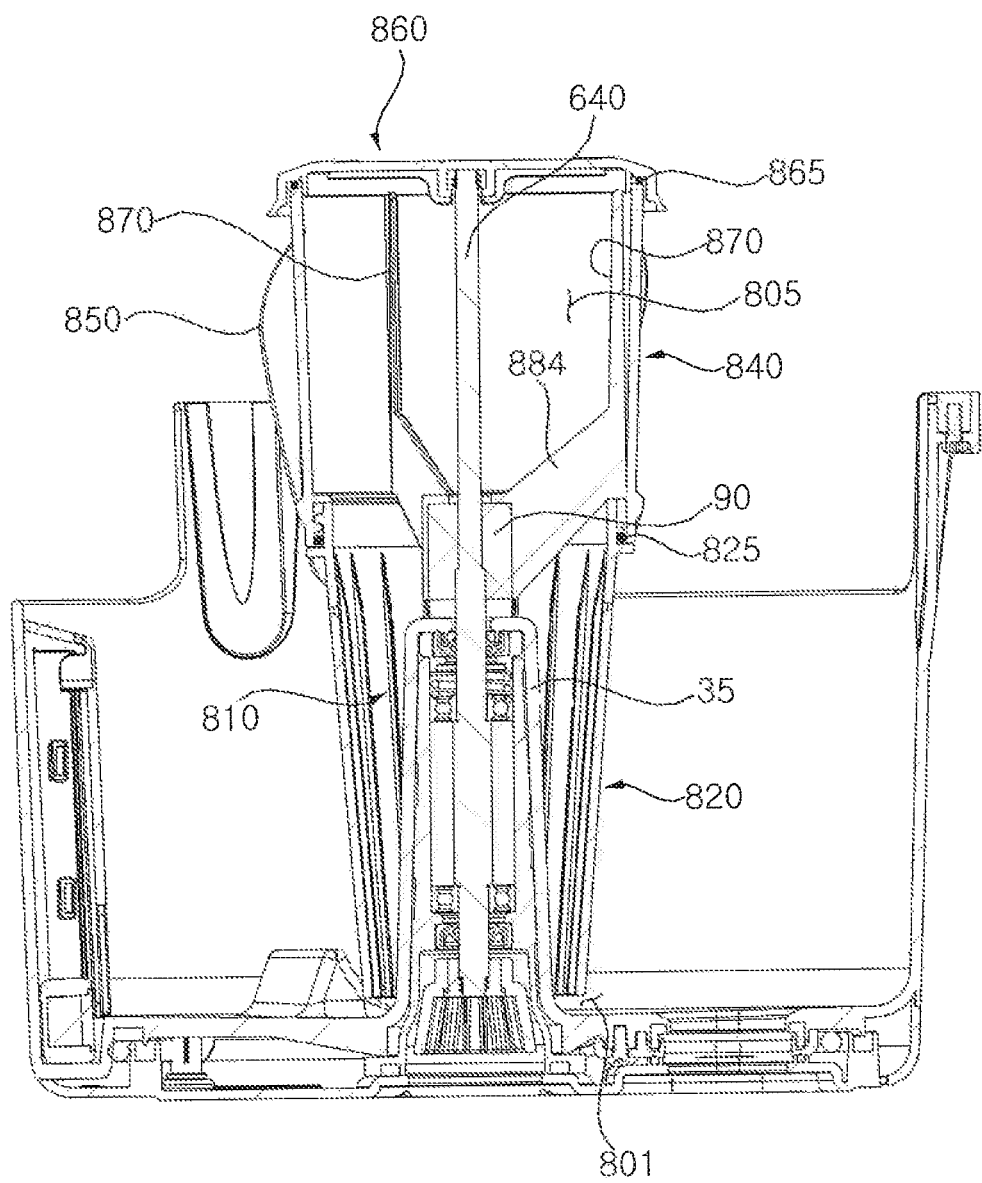
FIG. 9 is a cross-sectional view, taken along line IX-IX of FIG. 8.
Figure 10:
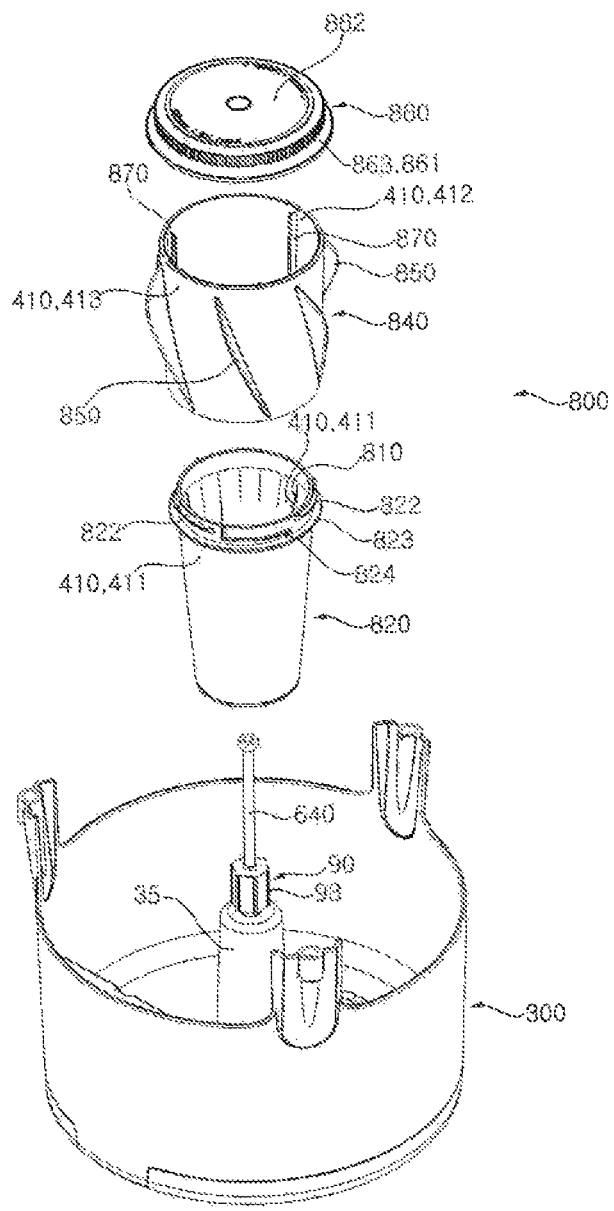
FIG. 10 is an exploded perspective view of the humidification housing of FIG. 8.
Figure 11:
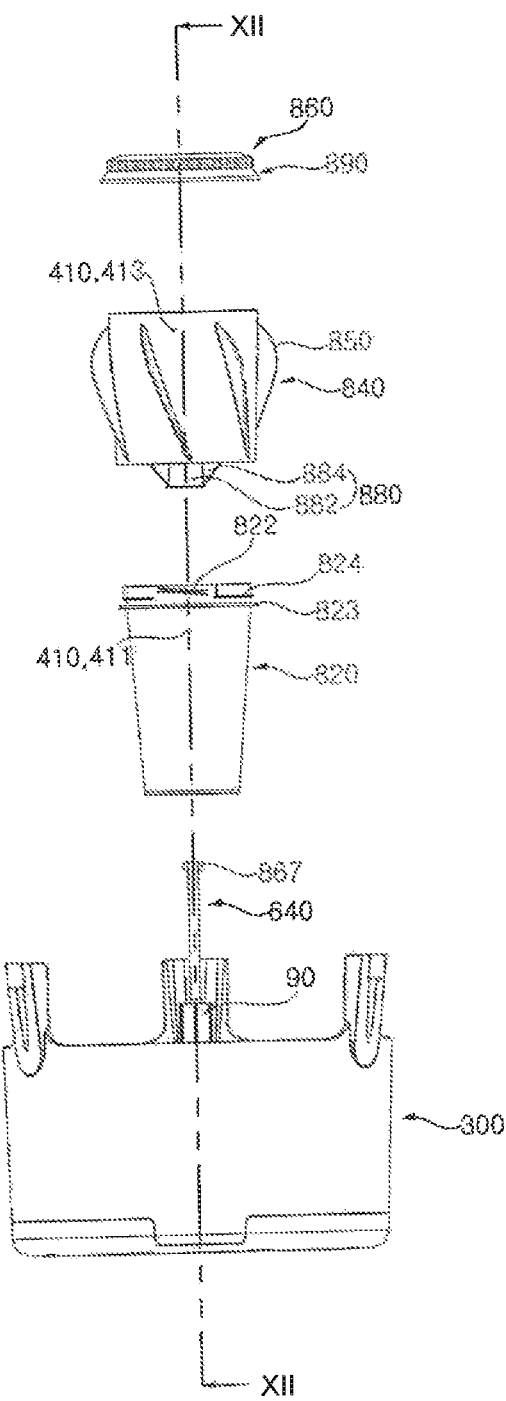
FIG. 11 is a front view of FIG. 10.
Figure 12:
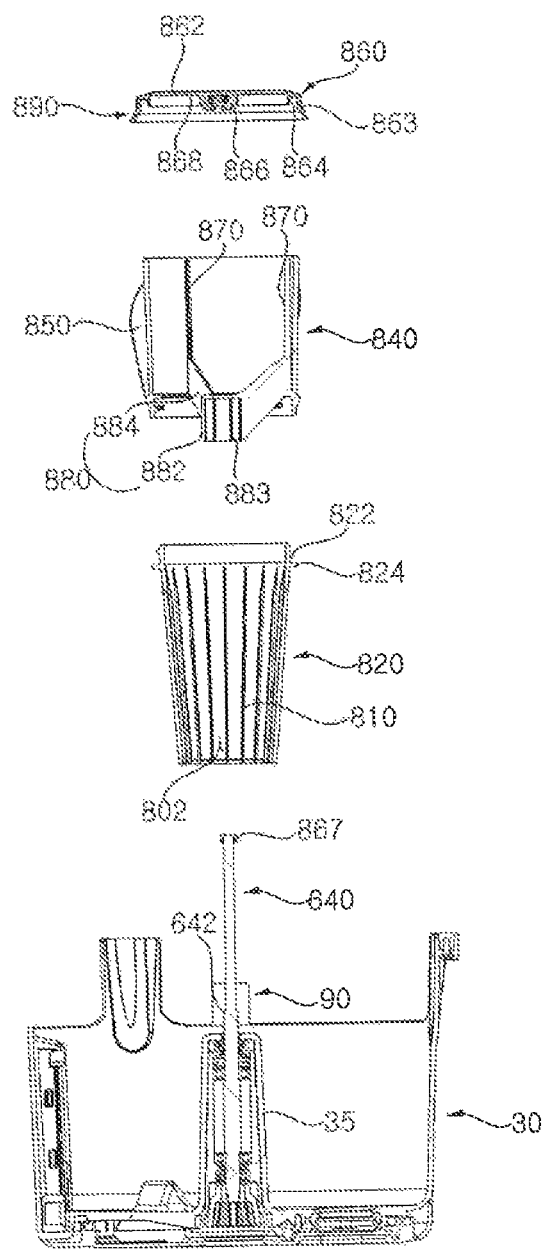
FIG. 12 is a cross-sectional view, taken along line XII-XII of FIG. 11.

FIG. 6 is a cross-sectional view of the air humidification module of FIG. 4; FIG. 7 is a magnified view of a portion G of FIG. 6, FIG. 8 is a front view illustrating an installation state of a humidification housing of FIG. 4; FIG. 9 is a cross-sectional view, taken along line IX-IX of FIG. 8; FIG. 10 is an exploded perspective view of the humidification housing of FIG. 8, FIG. 11 is a front view of FIG. 10, and FIG. 12 is a cross-sectional view, taken along line XII-XII of FIG. 11.

By rotating, the humidification housing 800 draws in water stored in the water tank 300 and sprays the water outwardly in a radial direction. The humidification housing 800 has a structure for efficiently pumping the water stored in the water tank 300.

The humidification housing 800 rotates by the torque of motor 42. During rotation, the humidification housing 800 may draw in water stored in the water tank 300 and may pump the water upwardly. The water pumped into the humidification housing 800 may be discharged through a nozzle 410.

A pumping unit may be disposed in the humidification housing 800. The pumping unit may pump the water in the water tank 300 upwardly. The water in the water tank 300 may be pumped by various methods. Water may be pumped upwardly through friction or mutual interference with water, which occurs when the humidification housing 800 rotates.

A structure for pumping water by rotation of the humidification housing 800 is provided. The pumping unit may be a groove 810 which pumps water upwardly through friction or mutual interference with water.

The groove 810 as a pumping unit is disposed on the inner surface of the humidification housing 800. The groove 810 improves pumping efficiency. The groove 810 may protrude from an inner surface of the humidification housing 800. The groove 810 may be elongated in a vertical direction. The groove 810 may be disposed radially about a motor shaft 43 or power transmission shaft 640.

A lower end of the humidification housing 800 may be spaced apart from a bottom surface of the water tank 300 by a predetermined distance to form a suction gap (H1) 801. Water in the water tank 300 may be drawn into the humidification housing 800 through the suction gap 801.

A water level H2 of the water tank 300, at which the humidification housing 800 may spray water, is above the suction gap H1 and is below the nozzle 410. The water level H2 includes a full water level.

If the water level H2 is below the suction gap H1, water is not drawn in such that pumping may not be performed. If the water level H2 is above the nozzle 410, water pumped to the nozzle 410 may not be sprayed.

The humidification housing 800 has an open lower surface, and side and upper surfaces are closed. The humidification housing 800 may have a cylindrical shape with an open lower surface. The humidification housing 800 may have an inverted cup shape. A housing space 805 may be formed inside of the humidification housing 800.

A column 35 of the water tank 300 may be located inside of the humidification housing 800, and a power transmission assembly 600 may be disposed inside of the column 35. The humidification housing 800 may be disposed to cover the column 35.

The column 35 may protrude upward from the bottom surface of the water tank 300 and may pass through the lower surface of the humidification housing 800 to be formed therein. The column 35 and the humidification housing 800 may be spaced apart from each other and connected by the power transmission assembly 600.

The humidification housing 800 may be formed such that a horizontal section thereof is gradually expanded in an upward direction. By contrast, the column 35 may be formed such that the horizontal section thereof is gradually reduced in an upward direction. Shapes of the humidification housing 800 and the column 35 are formed to effectively pump water. A capacity of the housing space 805 may gradually increase in an upward direction.

When the humidification housing 800 rotates, the drawn water may be closely adhered to an inner circumferential surface of the humidification housing 800 by centrifugal force. The groove 810 formed on the inner circumferential surface of the humidification housing 800 may provide torque to the drawn water.

The nozzle 410 for discharging the drawn water to the outside may be disposed in the humidification housing 800. The nozzle 410 may discharge water in a horizontal direction. The nozzle 410 may pass through the side wall of the humidification housing 800.

When the humidification housing 800 rotates, the water inside of the humidification housing 800 may be discharged to the outside in a radial direction through the nozzle 410. The water discharged through the nozzle 410 may be sprayed to the visual body 210.

A number of nozzles 410 may vary according to design conditions. In this case, a plurality of nozzles 410 having different heights may be provided in the humidification housing 800. The nozzles disposed at an upper portion of the humidification housing 800 may be defined as upper nozzles 412 and 413, and the nozzle disposed at a middle portion of the humidification housing 800 may be defined as a lower nozzle 411.

The water sprayed from the lower nozzle 411 may be used for humidification. The water sprayed from the upper nozzles 412 and 413 may be used for humidification, watering, and rain view.

The lower nozzle 411 may be disposed below the upper nozzles 412 and 413. The lower nozzle 411 may be disposed below the visual body 210.

The upper nozzles 412 and 413 may be disposed within a height of the visual body 210, and the water sprayed from the upper nozzles 412 and 413 may be seen through the visual body 210. The water sprayed from the upper nozzles 412 and 413 may be sprayed or scattered to the visual body 210, and water flowing down along the inner surface of the visual body 210 may wet the water tank humidification medium 51.

The water sprayed from the upper nozzles 412 and 413 hits the visual body 210 and then is scattered to form a rain view. After hitting the visual body 210, the water sprayed from the upper nozzles 412 and 413 may be changed into fine droplets, which may be used to humidify filtered air.

When the humidification housing 800 rotates at a speed higher than or equal to a first rotational speed, water may be sprayed from the lower nozzle 411. When the humidification housing 800 rotates at a speed higher than or equal to a second rotational speed, water may be sprayed from the upper nozzles 412 and 413. The second rotational speed may be higher than the first rotational speed.

The first rotational speed is a rotational speed of the humidification housing 800, at which water may be pumped to the inside of the lower nozzle 411. The second rotational speed is a rotational speed of the humidification housing 800, at which water may be pumped to the inside of the upper nozzles 412 and 413. Water may be discharged from the upper nozzles 412 and 413 only when the humidification housing 800 rotates at a high speed.

A plurality of upper nozzles may be disposed at the humidification housing 800. A plurality of lower nozzles may be disposed at the humidification housing 800.

If the humidification housing 800 rotates at a usual rotational speed, the pumped water may rise to a level at least higher than the lower nozzle 411. If the humidification housing 800 rotates at a high speed, the pumped water may rise to a level equal to or higher than a height of the upper nozzles 412 and 413.

At the second rotational speed, water is pumped up to a lower side of a housing cover 860. At the second rotational speed, the pumped water is stored at an upper side of an interior of the humidification housing 800.

A plurality of upper nozzles may be disposed in a circumferential direction of the humidification housing 800. Also, a plurality of lower nozzles may be disposed in a circumferential direction of the humidification housing 800.

If the humidification housing 800 does not rotate, water may not be discharged through the lower nozzle 411. When a user selects only an air cleaning mode (a mode in which the air cleaning module operates while the air humidification module is stopped), the water dispensing unit 400 does not operate, but only the air blower unit 20 operates. When a user selects a humidification mode, the humidification housing 800 rotates and water is discharged through the nozzle 410. When a user selects both the air cleaning mode and the humidification mode, water discharged through the nozzle 410 may be sprayed to the inner surface of the visual body 210.

As the humidification housing 800 rotates, the water discharged from the nozzle 410 may hit the inner surface of the visual body 210 and then flow along the inner surface of the visual body 210. A user may visually check through the visual body 210 that water is sprayed. The spraying of water may indicate that the humidification mode is in operation. By seeing the spraying of water, a user may intuitively check that the humidification mode is in operation. Droplets may be formed on the visual body 210 by the sprayed water, and when a size of the droplets is greater than or equal to a predetermined size, the droplets may flow down.

The humidification housing 800 will be described hereinafter with reference to FIGS. 7 to 12.

The humidification housing 800 may include three parts. Alternatively, the humidification housing 800 may be manufactured with one or two components.

A lower end of the humidification housing 800 may be spaced apart from the bottom surface of the water tank 300 by a predetermined distance. The humidification housing 800 may include a first housing 820, a second housing 840, housing cover 860, and a power transmission unit 880.

The humidification housing 800 may be assembled with the power transmission shaft 640 and receives torque from the power transmission shaft 640. The power transmission unit 880 and the housing cover 860 may be assembled with the power transmission shaft 640. The humidification housing 800 may be connected to the power transmission shaft 640 at two points and receives torque from the two points.

Alternatively, the humidification housing 800 may be connected to the power transmission shaft 640 at one point and may receive torque from the one connected point. Further, alternatively, the humidification housing 800 may receive torque by a method other than the power transmission shaft 640. For example, the torque of the motor may be delivered by a belt-pulley method. For example, the torque of the motor may be delivered by a gear engagement method. For example, the torque of the motor may be delivered by a chain method. For example, the torque of the motor may be delivered by a clutch method.

The power transmission shaft 640 may have a screw thread 643 formed at each of upper and lower ends thereof. The screw thread 643 may be assembled with the housing cover 860. The lower screw thread may be assembled with a second coupler 620. A first coupler 620, coupled to the second coupler 620, may be disposed on the upper body 120.

The motor 42 may be disposed in the upper body 120. The motor 42 may provide torque to the humidification housing 800.

A coupler disposed in the air cleaning module 100 and coupled to the motor 42 may be defined as the first coupler 610 (see FIG. 3). A coupler disposed in the air humidification module 200 and detachably coupled to the first coupler 610 may be defined as the second coupler 620 (see FIG. 3).

Any one of first coupler 610 or the second coupler 620 may have a male shape, and the other one may have a female shape. In this embodiment, the first coupler 610 has a male shape, and the second coupler 720 has a female shape. Further, the first coupler 610 is inserted into the second coupler 620 to be detachably coupled thereto. Alternatively, the second coupler 620 may be inserted into the first coupler 610 to be coupled thereto.

The motor 42 may be installed in the upper body 120. The motor 42 may be placed over the blower motor 22 and spaced apart from the blower motor 22. The water tank 300 may be disposed in the upper body 120. When the water tank 300 is disposed in the upper body 120, the first coupler 610 and the second coupler 620 may be connected to allow for power transmission. The motor shaft 43 of the motor 42 may be disposed to be directed upward. The first coupler 610 may be disposed at the upper end of the motor shaft 43.

The first housing 820 may have upper and lower sides which are open and the groove 810 formed on the inner surface thereof. A lower end of the first housing 820 may be spaced apart from the bottom surface of the water tank 300 to form the suction gap 801.

The second housing 840 may have upper and lower sides which are open and be assembled with the upper end of the first housing 820. The housing cover 860 may be coupled to an upper end of the second housing 840 and cover an upper surface of the second housing 840. Further, the housing cover 860 may close the upper opening of the humidification housing 800.

The power transmission unit 880 may be connected to at least either the first housing 820 or the second housing 840 to receive the torque of the power transmission assembly 600. In this embodiment, the power transmission unit 880 is connected to the first housing 820.

Alternatively, the first housing 820 and the second housing 840 may be integrally formed with each other. Further, the first housing 820 and the housing cover 860 may be integrally formed with each other.

An upper section of the first housing 820 may be larger than a lower section thereof. The first housing 820 may be inclined vertically. The first housing 820 may have a conical shape with a narrow lower section.

The first housing 820 may have the groove 810 formed therein. The groove 810 may be formed in a vertical direction. The groove 810 may be disposed radially about the motor shaft 43. A plurality of grooves 810 may be disposed, which may protrude toward an axial center of the humidification housing 800.

The lower end of the first housing 820 may be spaced apart from the bottom surface of the interior of the water tank 300, to form the suction gap 801. The upper end of the first housing 820 may be coupled to the lower end of the second housing 840.

The first housing 82 and the second housing 840 may be assembled with or disassembled from each other. The first housing 820 and the second housing 840 may be assembled via screw coupling. The first housing 820 may have a screw thread 822 formed on an outer circumferential surface of an upper side thereof, and the second housing 840 may have a screw thread 842 formed on an inner circumferential surface of a lower side thereof. The screw thread 822 formed on the first housing 820 may be defined as a first thread 822, and the screw thread 842 formed on the second housing 840 may be defined as a second screw thread 842.

A first barrier 823 may be formed below the first thread 822 to restrict movement of the second housing 840. The first barrier 823 may be formed in a circumferential direction of the first housing 820. The first barrier 823 may be formed in a strip shape, and protrude outwardly from the first housing 820.

When the first housing 820 and the second housing 840 are assembled, the first barrier 823 may be closely adhered to a lower end of the second housing 840. The first barrier 823 may protrude outwardly further than the first screw thread 822.

A first packing 825 may be disposed between the first screw thread 822 and the first barrier 823. The first packing 825 may prevent water from leaking between the first housing 820 and the second housing 840. The first packing 825 may be formed of an elastic material. The first packing 825 may have a ring shape.

A rib 824 may be disposed to fix a position of the first packing 825. The rib 824 may be disposed on an extension line of the first screw thread 822. The rib 824 may be a portion of the first screw thread 822. Accordingly, a plurality of first screw threads 822 may be formed which are distributed discontinuously, and the rib 824 may be one of the first screw threads 822.

The lower nozzle 411 may be disposed in the first housing 820. In this embodiment, two lower nozzles 411 are disposed, which face in opposite directions.

The lower nozzle 411 may allow the inside and outside of the first housing 820 to communicate with each other. In this embodiment, an inner opening area of the lower nozzle 411 is greater than an outer opening area of the lower nozzle 411. The lower nozzle 411 supplies water to the water tank humidification medium 51 to wet the water tank humidification medium 51. The lower nozzle 411 may spray water to the water tank humidification medium 51.

A blade 850 may be formed on an outer circumferential surface of the second housing 840. The blade 850 may allow humidified air to flow. When the humidification housing 800 rotates, the blade 850 may draw in ambient air. The blade 850 may have a function of a rain view creating unit that atomizes droplets, as well as a function of circulating air.

Air of the humidification passage 106, disposed in the humidification housing 800, mostly flows to the discharge passage 107 by operation of the blower fan 24, but air around the blade 850 may flow in an opposite direction. The blade 850 may locally form an air flow in the opposite direction to air flow generated by the blower fan 24. The blade 850 may also form an air flow in the same direction as the air flow generated by the blower fan 24, according to the shape of the blade 850. In this case, air around the humidification housing 800 may gather on the surface of the humidification housing 800.

The air flow, generated by the blade 850, has an effect of allowing water particles around the humidification housing 800 to flow into the water tank 300. Rotation of the blade 850 has an effect of generating an air volume and drawing in water particles around the humidification housing 800. Accordingly, the air flow, generated by the blade 850, may serve to gather falling water into the humidification housing 800 when water drops from the water supply passage 109 to the upper portion of the humidification housing 800.

If water is supplied through the water supply passage 109 when the humidification housing 800 rotates, the water may hit the surface of the humidification housing 800 and scattered irregularly. The air flow generated by the blade 850 may gather water particles, which are scattered during the supply of water, toward the surface of the humidification housing 800.

The second housing 840 has the upper nozzles 412 and 413. The upper nozzles 412 and 413 spray water toward the visual body 210. In this embodiment, two upper nozzles 412 and 413 are disposed, one of which is defined as a first upper nozzle 412 and the other is defined as a second upper nozzle 413.

The first upper nozzle 412 and the second upper nozzle 413 may be disposed to face in different directions. For example, the first upper nozzle 412 and the second upper nozzle 413 may be disposed to face in opposite directions. The first upper nozzle 412 and the second upper nozzle 413 may be symmetrical to each other with respect to the power transmission shaft 640.

When viewed from the top, the first upper nozzle 412 and the second upper nozzle 413 form an included angle of 180 degrees. When viewed from the top, the first upper nozzle 412 is disposed between the blades 850, and the second upper nozzle 413 is also disposed between the blades 850.

When viewed from a front, the first upper nozzle 412 and the second upper nozzle 413 are disposed at a same height as or above the blade 850. A portion of trajectories S3 and S4 of water sprayed from the first upper nozzle 412 and the second upper nozzle 413 may be located within a radius of gyration of the blade 850. Accordingly, when the humidification housing 800 rotates, a portion of water sprayed from the first upper nozzle 412 and the second upper nozzle 413 is scattered by hitting the blade 850.

In this embodiment, the first upper nozzle 412 and the second upper nozzle 413 have a predetermined height difference. The first upper nozzle 412 and the second upper nozzle 413 are not disposed a same height.

As the first upper nozzle 412 and the second upper nozzle 413 have different heights, positions of water hitting the visual body 210 may be set differently, such that when the humidification housing 800 rotates, water sprayed from the first upper nozzle 412 and water sprayed from the second upper nozzle 413 may pass through different paths. The trajectory S3 of water hitting the inner surface of the visual body 210 from the second upper nozzles 412 and 413 may be defined as a spray line. The spray line may be a continuous water stream. A spray line formed by the first upper nozzle 412 may be defined as a first spray line L1, and a spray line formed by the second upper nozzle 413 may be defined as a second spray line L2.

The spray line formed in the visual body 210 may not only be a straight line. The spray line may also be a curved line according to an angle at which water is discharged from the nozzle.

Further, a thickness of the spray line may vary according to a diameter of the nozzle. That is, when a diameter of the nozzle is large, the spray line may be thick, and when a diameter of the nozzle is small, the spray line may be thin.

In this embodiment, after a lapse of a predetermined period of time when water sprayed from the first upper nozzle 412 passes through any one location of the visual body 210, water sprayed from the second upper nozzle 413 may pass through another location having a different height. That is, two spray lines L1 and L2 may be formed on the inner surface of the visual body 210, and this visual effect may allow a user to recognize spraying of water more effectively.

When water is discharged from two upper nozzles disposed at a predetermined height, only one spray line is formed. When the humidification housing 800 rotates at a high speed, even if the first and second upper nozzles 412 and 413 are disposed in opposite directions, a very short phase difference may be formed, thereby causing a user to mistakenly think that water flows down from one spray line.

In addition, when two spray lines are formed, water hits different locations, such that different sounds are generated by the hitting water. That is, the sound generated from the first spray line is different from the sound generated by the second spray line. By this sound difference, a user may acoustically recognize rotation of the humidification housing 800.

When only one spray line is formed, the same sound is generated continuously, such that a user may not recognize the sound or may mistake the sound as simply noise.

The different sounds generated from the plurality of spray lines may have an effect of allowing people with low vision or hearing loss to effectively recognize operating circumstances. Further, even in a dark environment with no light, a user may easily recognize that the humidification and air cleaning apparatus is in operation.

At least one of the upper nozzles 412 and 413 may be partially covered by the housing cover 860. In this embodiment, the first upper nozzle 412 is fully open, and the second upper nozzle 413 is partially overlapped and covered by the housing cover 860.

The housing cover 860 may be disposed in front of the second upper nozzle 413. The housing cover 860 may partially cover an upper part or portion of the second upper nozzle 413. In this embodiment, when the housing cover 860 is coupled to the second housing 840, the housing cover 860 overlaps a portion of the second upper nozzle 413.

Water sprayed from the second upper nozzle 413 may interfere with a diffusion member, such that a spray angle and width may be changed. The water interfering with the diffusion member may be pulled toward the diffusion member by surface tension.

The spray line discharged from the first upper nozzle 412 has a similar diameter to that of the nozzle. Water discharged from the second upper nozzle 413 overlaps with the housing cover 860, such that water may be scattered to a wider range than the diameter of the second upper nozzle 413.

A trajectory of water sprayed from the first upper nozzle 412 is defined as S3, and a trajectory of water sprayed from the upper nozzle 413 is defined as S4. The second upper nozzle 413 is disposed slightly above the first upper nozzle 412. Droplets sprayed from the second upper nozzle 412 may be smaller than droplets sprayed from the first nozzle 412. The trajectory S4 of droplets sprayed from the second upper nozzle 413 is located above the trajectory S3 of droplets sprayed from the first upper nozzle 412. The droplets sprayed from the second upper nozzle 413 are sprayed more widely than droplets sprayed from the first upper nozzle 412. Accordingly, the spray line L2 formed by the overlapped second upper nozzle 413 has a wider width than the spray line L1 formed by the first upper nozzle 412.

In addition, the blade 850 may allow air around the humidification housing 800 to flow, and may atomize water sprayed from the nozzle 410 into fine particles. Water sprayed from the upper nozzles 412 and 413 may hit the blade 850 to be atomized into fine particles. The blade 850 may atomize water into a mist form.

The blade 850 may not atomize all water sprayed from the upper nozzles 412 and 413. A portion of water sprayed from the upper nozzles 412 and 413 may hit the blade 850.

Water sprayed from the upper nozzles 412 and 413 forms the predetermined trajectory S3, and the rotating blade 850 collides with water on the trajectory S3. That is, a portion of water sprayed from the upper nozzles 412 and 413 hits the blade 850 to be scattered, and the remaining water hits the inner surface of the visual body 210 without hitting the blade 850.

Water hitting the blade 850 is widely scattered in the visual body 210, rather than being scattered in a specific direction. For example, water scattered from the blade 850 may wet the discharge humidification medium 55. Water scattered from the blade 850 may form water drops on the visual body 210. Water scattered from the blade 850 may float into the water tank 300.

Water atomized by the blade 850 may be effective in creating a rain view. The atomized droplets may be shown in the form of small droplets on the inner surface of the visual body 210.

Further, a rain view created in the humidification passage 106 may generate negative ions by the Lenard effect. The Lenard effect refers to a phenomenon in which large amounts of negative ions are generated when water is atomized by a large external force. When the droplets are scattered and hit to create a rain view, large amounts of negative ions are generated in the process.

When water sprayed from the lower nozzle 411 hits a structure, negative ions may be generated by the Lenard effect. Further, when water sprayed from the upper nozzles 412 and 413 hits the visual body 210, negative ions may be generated by the Lenard effect. Also, when water sprayed from the upper nozzles 412 and 413 hits the blade 850, negative ions may be generated by the Lenard effect. In addition, when water is supplied from above, droplets scattered from the housing cover 860 hit various structures, negative ions may be generated by the Lenard effect.

As described above, in this embodiment, droplets formed in various sizes for creating a rain view may have an effect of generating negative ions. The generated negative ions may be discharged to an indoor space through the discharge passage 107.

Further, a water curtain inhibiting rib 870 may be disposed in the second housing 840 to inhibit a water curtain rotating flow. The water curtain rotating flow may refer to a rotating flow along the inner surface of the humidification housing 800.

As more water stays in the second housing 840, vibrations of the humidification housing 800 may increase. Water pumped up to the second housing 840 is required to be sprayed rapidly through the upper nozzles 412 and 413, in order to minimize eccentricity of the humidification housing 800, and thus, to minimize vibrations thereof.

The water curtain inhibiting rib 870 may protrude from an inner surface of the second housing 840. In this embodiment, the water curtain inhibiting rib 870 protrudes toward the power transmission shaft 640. The water curtain inhibiting rib 870 is formed in a direction intersecting the water curtain rotating flow.

The power transmission unit 880 transmits torque of the power transmission shaft 640 to the humidification housing 800. In this embodiment, the power transmission unit 880 is connected to the second housing 840. Alternatively, the power transmission unit 880 may be connected to the first housing 820.

In this embodiment, the power transmission unit 880 is integrally formed with the second housing 840. Alternatively, the power transmission unit 880 may be manufactured separately from the second housing 840, and then may be assembled thereto.

The power transmission unit 880 may include a bushing installation part or portion 882 located at an axial center of the humidification housing 800, and a connection part or portion (connector) 884 that connects the bushing installation portion 882 and the housing 800. In this embodiment, the bushing installation portion 882, the connection portion 884, and the second housing 820 may be integrally formed by injection-molding, for example.

The connection portion 884 may be formed in a rib shape. The connection portion 884 may be disposed radially about the axial center, and a plurality may be provided.

In this embodiment, the connection portion 884 is integrally formed with the water curtain inhibiting rib 870. The connection portion 884 and the water curtain inhibiting rib 870 are connected to each other.

The power transmission shaft 640 may be installed so as to penetrate the bushing installation portion 882. The bushing installation portion 882 may have an open lower side. A bushing 90 may be inserted through an open lower side of the bushing installation portion 882.

The bushing installation portion 882 and the bushing 90 may be separated from each other in a vertical direction. The bushing installation portion 882 and the bushing 90 may be engaged with each other in a rotational direction.

A bushing engaging portion 93 may be formed on any one of the bushing installation portion 882 and the bushing 90, and a bushing engaging groove 883 may be formed on the other one thereof. In this embodiment, the bushing engaging portion 93 may be formed on the bushing 90, and the bushing engaging groove 883 may be formed on the bushing installation portion 882.

The bushing engaging groove 883 may be formed on the inner surface of the bushing installation part 882 and have a concave shape. The bushing engaging portion 93 may be formed on an outer surface of the bushing 90 and have a convex shape. The busing engaging portion 93 may be inserted and fitted into the bushing engaging groove 882.

Alternatively, the bushing installation portion 882 and the bushing 90 may be integrally formed with each other. The bushing 90 may be formed of a metallic material, such that by placing the bushing 90 in the mold when the second housing 840 is manufactured, the bushing 90 may be integrally formed by injection-molding a material of the second housing 840.

The bushing 90 may be coupled to the power transmission shaft 640 of the power transmission assembly 600. The bushing 90 may be coupled to the power transmission shaft 640 to receive torque. The bushing 90 may be formed of a metallic material. If the bushing 90 is not formed of a rigid metallic material, abrasion may occur, which causes vibrations.

The bushing 90 may have a bushing axis hollow that passes through the bushing 90 in a vertical direction. The power transmission shaft 640 may be inserted into the bushing axis hollow.

The bushing 90 may reduce vibrations occurring when the humidification housing 800 rotates. The bushing 90 may be located on the power transmission shaft 640. In this embodiment, the bushing 90 may be located at a center of gravity of the humidification housing 800. As the bushing 90 is located at the center of gravity of the humidification housing 800, the bushing 90 may significantly reduce the vibrations of the humidification housing 800 during rotation.

The bushing 90 and the power transmission shaft 640 are assembled with each other through fitting. The bushing 90 is supported by the power transmission shaft 640.

In order to support the bushing 90, the power transmission shaft 640 may include a shaft support end 642. A diameter at an upper side of the power transmission shaft 640 may be smaller than a diameter at a lower side based on the shaft support end 642.

The bushing 90 may be inserted onto the upper end of the power transmission shaft 640. In order to minimize abrasion, the shaft support end 642 may be formed in a tapered, chamfered, or rounded shape. When the shaft support end 642 has a right-angled shape, abrasion may occur during an assembly process or operation process.

When the shaft support end 642 is abraded, the bushing 90 may be moved, which causes vibrations. Also, when the shaft support end 642 is abraded, the bushing 90 may be inclined or moved, such that misalignment with the power transmission shaft 640 may occur. In addition, when misalignment between the bushing 90 and the power transmission shaft 640 occurs, eccentricity may occur during rotation, thereby causing vibrations.

Figure 13:
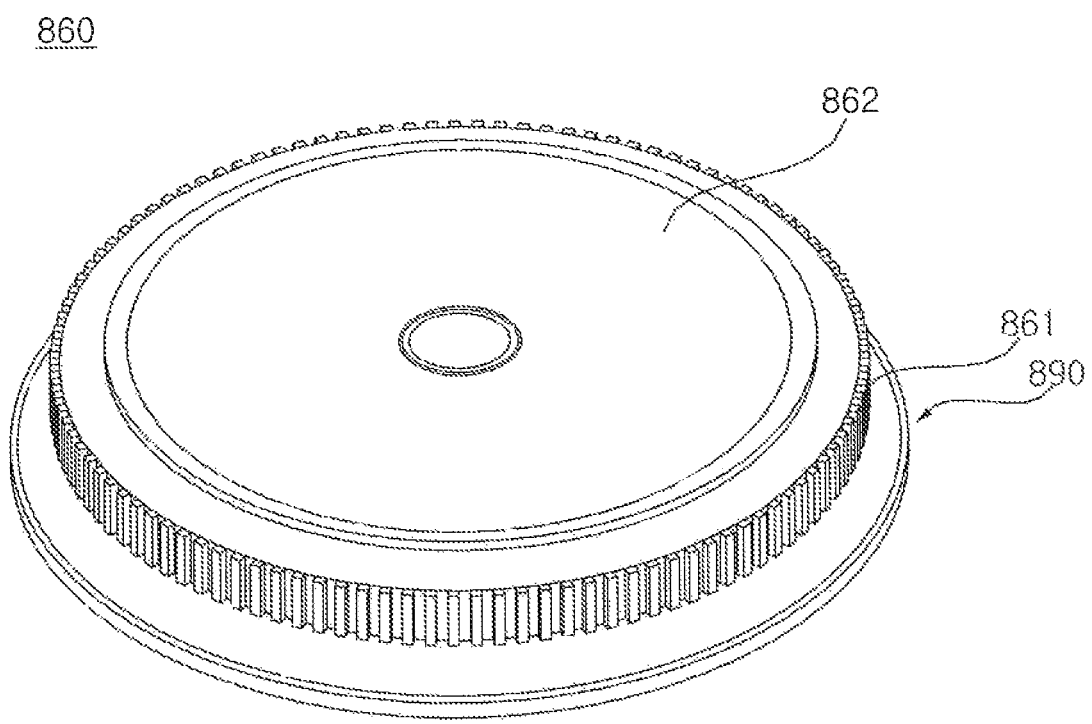
FIG. 13 is a perspective view of a housing cover of FIG. 6.
Figure 14:
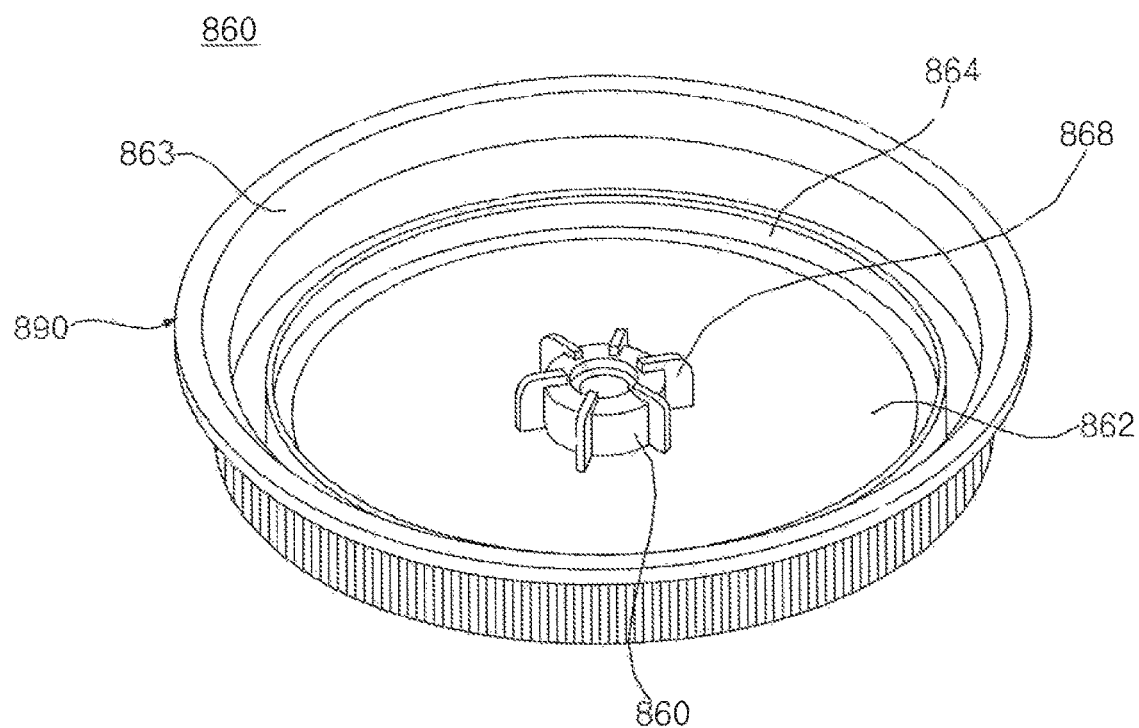
FIG. 14 is a perspective view of a lower surface of the housing cover of FIG. 13.
Figure 15:
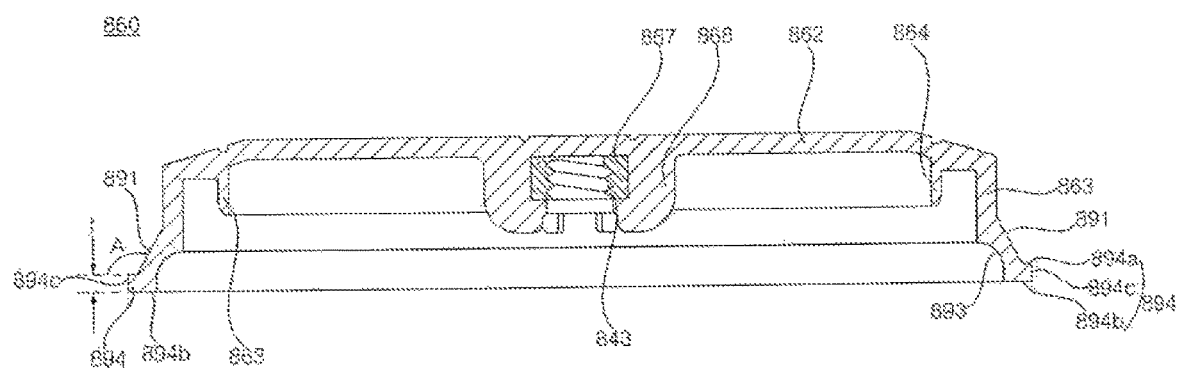
FIG. 15 is a front cross-sectional view of the lower surface of the housing cover of FIG. 13.
Figure 16:
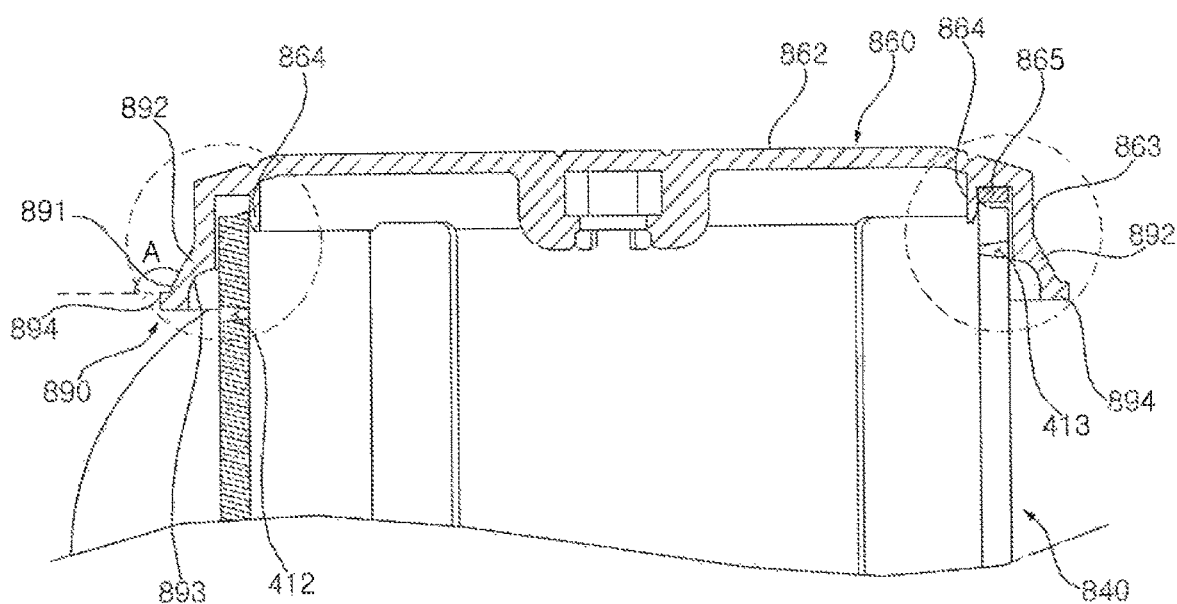
FIG. 16 is a partial cross-sectional view of an upper side of a humidification housing, illustrating an arrangement of nozzles and a housing cover.
Figure 17:
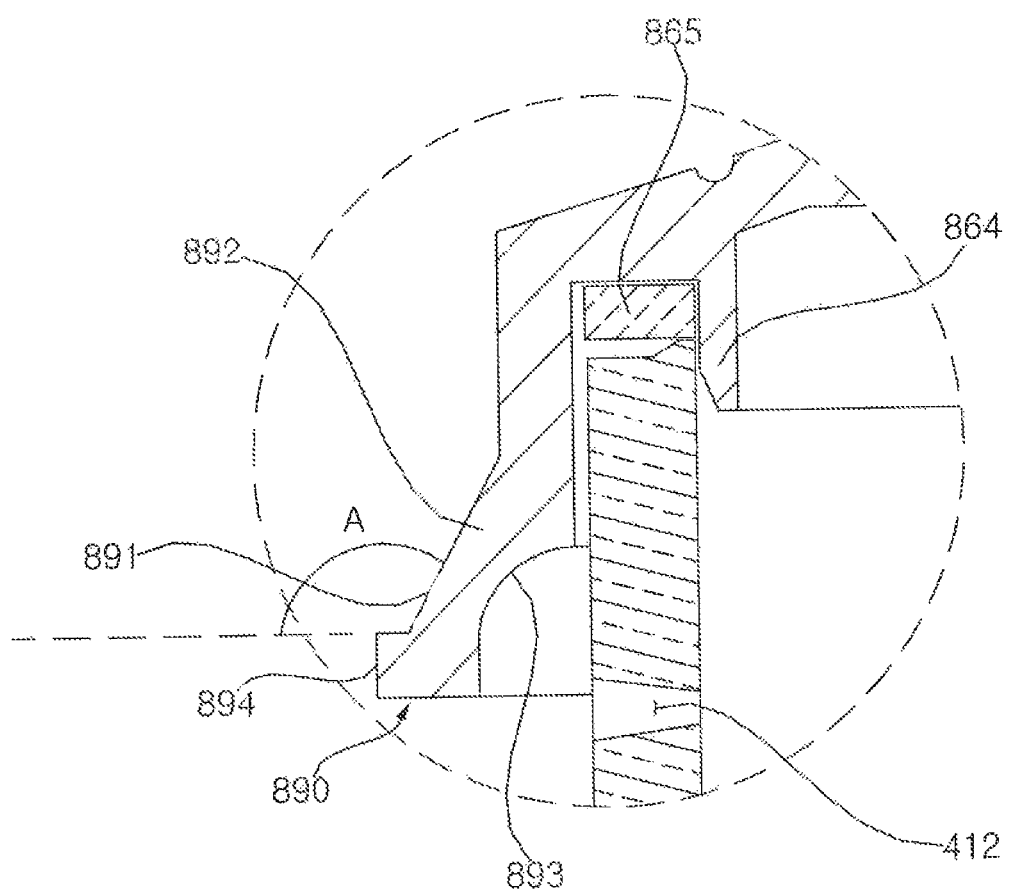
FIG. 17 is a magnified cross-sectional view of a first upper nozzle of FIG. 16.
Figure 18:
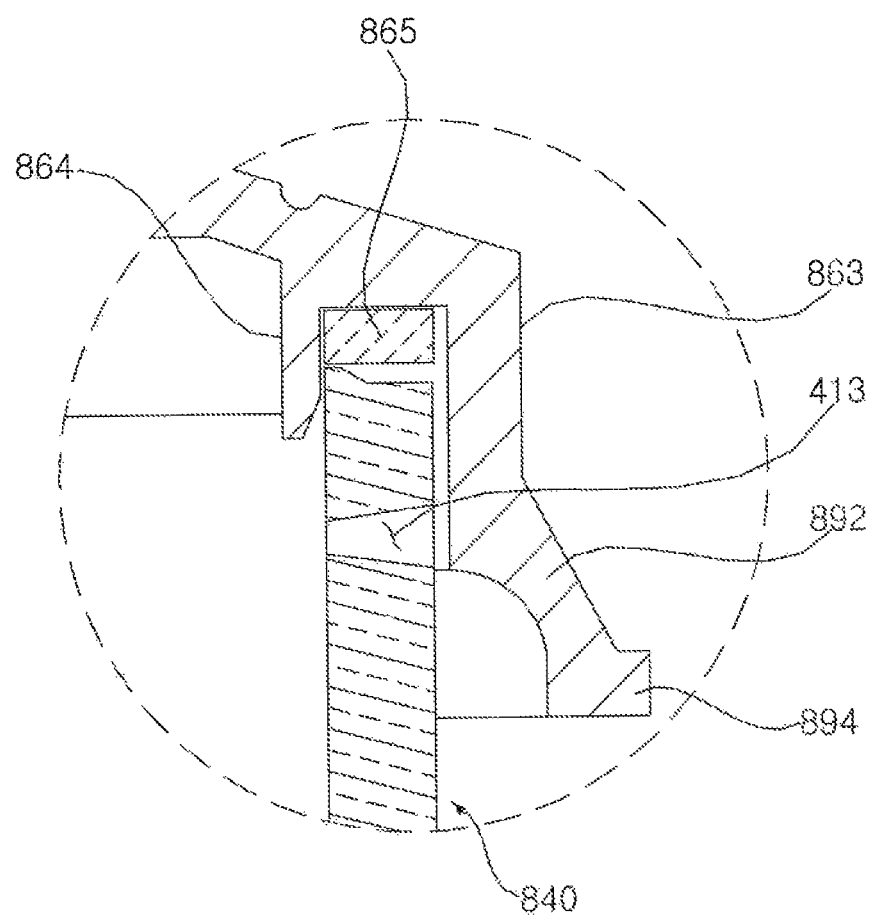
FIG. 18 is a magnified cross-sectional view of a second upper nozzle of FIG. 16.

FIG. 13 is a perspective view of a housing cover illustrated in FIG. 6. FIG. 14 is a perspective view of a lower surface of the housing cover of FIG. 13. FIG. 15 is a front cross-sectional view of the lower surface of the housing cover of FIG. 13. FIG. 16 is a partial cross-sectional view of an upper side of a humidification housing, illustrating an arrangement of nozzles and a housing cover. FIG. 17 is a magnified cross-sectional view of a first upper nozzle illustrated in FIG. 16. FIG. 18 is a magnified cross-sectional view of a second upper nozzle illustrated in FIG. 16.

Referring to FIGS. 13 to 18, the housing cover will be described hereinafter.

The housing cover 860 may be coupled to an upper side of the second housing 840 and seal the upper side of the second housing 86. In this embodiment, the housing cover 860 may be coupled to the second housing 840 by screw coupling.

The housing cover 860 is assembled with the power transmission assembly 600. Alternatively, the housing cover 860 may be separated from the power transmission assembly 600.

When the housing cover 860 is coupled to the power transmission shaft 640, eccentricity and vibration of the humidification housing 800 may be reduced more effectively.

The housing cover 860 may include a top wall 862 that covers an upper opening of the second housing 840; a side wall 863 that extends downwardly from the top wall 862 and covers an upper end of the second housing 840; an inner rib 864 disposed under the top wall 862 and spaced apart from the side wall 863 by a predetermined distance; a shaft fixing part or portion 866 disposed under the top wall 862 and fixed to the power transmission shaft 640; a reinforcing rib 868 that connects the shaft fixing portion 866 and the inner rib 864; and a shield 890 that extends downwardly from the side wall 863 and spaced apart from the outer surface of the second housing 840.

When viewed from the top, the top wall 862 may have a circular shape. A diameter of the top wall 862 may be greater than a diameter of the second housing 840.

Alternatively, it is also possible that the top wall 862 has a shape other than the circular shape, when viewed in a top plan view. Also, the humidification housing 800 is not limited to a specific shape, when viewed in top plan view.

The side wall 863 may form an edge of the top wall 862. The side wall 863 may extend downwardly from the edge of the top wall 862.

The side wall 863 may have a ring shape and be integrally formed with the top wall 862. The side wall 863 may have a plurality of protrusions 861 formed on an outer surface thereof, and the protrusions 861 may be formed in a circumferential direction of 360 degrees. The protrusions 861 may provide a grip feeling for a user when the housing cover 860 is separated.

Further, the protrusions 861 may effectively scatter water when supplied from above. Water supplied from above falls down to the housing cover 860 and flows to the side wall 863 by rotation of the humidification housing 800. Then, water may be separated from the protrusions 861 in the form of water drops, to be scattered to the inner surface of the visual body 210. The protrusions 861 may effectively scatter water supplied from above.

The inner rib 864 may be located inside of the side wall 863 and spaced apart from the side wall 863 by a predetermined distance. A second packing 865 may be disposed between the side wall 863 and the inner rib 864. When viewed from the bottom, the inner rib 864 may be formed in a ring shape and spaced apart from the inner surface of the side wall 863, and form a packing installation space which is downwardly open. The second packing 865 may be installed in the packing installation space.

The second packing 865 may seal a space between the housing cover 860 and the second housing 840. The first packing 825 and the second packing 865 may prevent leakage of water of the housing space 805, and pressure of water discharged from the nozzle 410 may be maintained constant.

If water leaks between the first housing 820 and the second housing 840 or between the second housing 840 and the housing cover 860, there is difficulty in maintaining a constant pressure of water discharged from the nozzle 410 and in providing the spray line in the form of a continuous water stream. That is, when water leakage occurs in the humidification housing 800, water may not be sprayed from the nozzle 410 even by rotation of the humidification housing 800.

The side wall 863 and the second housing 840 may be screw-coupled. In this embodiment, the housing cover 860 and the second housing 840 may be coupled to each other by forced fitting. The housing cover 860 and the power transmission shaft 640 may be maintained in a coupled state, such that even when the humidification housing 800 rotates, the housing cover 860 and the second housing 840 may be maintained in a coupled state.

The shaft fixing portion 866 may be assembled with the power transmission shaft 640 and receive torque from the power transmission shaft 640. The shaft fixing portion 866 and the power transmission shaft 640 may be screw-coupled to each other. A screw thread 643 for screw coupling with the housing cover 860 may be formed on an outer circumferential surface of an upper end of the power transmission shaft 640.

A screw thread 843 for assembling with the power transmission shaft 640 may be formed on the shaft fixing portion 866. In this embodiment, a shaft fixing member 867 may be disposed on the shaft fixing portion 866, and the shaft fixing member 867 may be integrally formed with the shaft fixing portion 866 by double injection-molding. In this embodiment, a nut may be used for the shaft fixing member 867.

Unlike the housing cover 860, the shaft fixing member 867 may be formed of a metallic material. As the power transmission shaft 640 is formed of a metallic material, a portion screw-coupled to the power transmission shaft 640 also needs to be made of a metallic material to prevent abrasion or damage during coupling.

When the entire housing cover 860 is formed of a metallic material, or when the shaft fixing portion 866 is formed of a metallic material, a screw thread may be formed on the shaft fixing portion 866 itself.

The housing cover 860 may have a diameter greater than a diameter of the second housing 840. When viewed from the top, only the housing cover 860 may be exposed, without exposing the second housing 840 and the first housing 820.

Accordingly, a portion of water supplied to the water supply passage 109 may fall down to the housing cover 860. When the humidification housing 800 rotates, the water falling down to the housing cover 860 may be sprayed outwardly in a radial direction from the surface of the housing cover 860.

The housing cover 860 which rotates may spray the supplied water in a rotational direction and may produce an effect as if water drops from an umbrella. More particularly, drops of water may be separated from the plurality of protrusions 861 disposed in a circumferential direction of the housing cover 860. The droplets scattered in the rotational direction of the housing cover 860 may collide with the inner surface of the visual body 210, thereby creating a rain view.

The shield 890 serves to prevent water, sprayed from the upper nozzles 412 and 413, from being sprayed or scattered beyond the upper nozzles 412 and 413. The shield 890 may extend outwardly in a radial direction from the side wall 863 and be spaced apart from an outer surface of the second housing 840. The shield 890 may be disposed outside of an upper opening of the humidification housing 800.

With respect to the power transmission shaft 640, the shield 890 include a shield portion 892, which protrudes outwardly in a radial direction from the side wall 863 and is inclined downwardly, and a scatter portion 894 which protrudes outwardly in a radial direction from the shield portion 892. In this embodiment, the first upper nozzle 412 and the second upper nozzle 413 have different heights, such that relative heights of the shield portion 892 and the upper nozzles 412 and 413 may be different from each other.

The shield portion 892 may be inclined downwardly and spaced apart from the outer surface of the second housing 840. An upper end of the shield portion 892 may be connected to a lower end of the side wall 863, and a lower end of the shield portion 892 may be spaced apart from the side wall 863. A horizontal section of the shield portion 892 may have a ring shape and a diameter which increases from an upper side toward a lower side.

An outer surface 891 and an inner surface 893 of the shield portion 892 may form an inclined surface. The outer surface 891 may be formed as an inclined surface facing outwardly and downwardly in a radial direction. The outer surface 891 may form a predetermined included angle A with the scatter portion 894. The included angle A between the outer surface 891 and the scatter portion 894 may be greater than 90 degrees and less than 180 degrees. Water may be guided to the scatter portion 894 along the outer surface 891. In this embodiment, the included angle A is 115 degrees.

Unlike the outer surface 891, the inner surface 893 may form a rounded surface. A center of curvature of the rounded surface may be located toward the inside of the humidification housing 800. An upper end of the rounded surface may be disposed lower than an upper end of the inclined surface, and a lower end of the rounded surface may be disposed lower than a lower end of the inclined surface. The lower end of the rounded surface may be connected to a lower surface of the scatter portion 894.

The inner surface 893 may be formed as a groove being recessed upwardly from the bottom side. The inner surface 893 may be open downwardly and toward the center of the humidification housing 800.

The scatter portion 894 may extend in a lateral direction, in this embodiment horizontally. The scatter portion 894 may protrude outwardly in a radial direction from the shield portion 892. When viewed from the top, the scatter portion 894 may have a ring shape and be disposed radially outside of the shield portion 892.

A lower surface 894*b* of the scatter portion 894 may be connected to a lower end of the inner surface 893. An upper surface 894*a* of the scatter portion 894 may be connected to a lower end of the outer surface 891. The included angle A may be formed between the upper surface 894*a* of the scatter portion 894 and the outer surface 891.

An outer surface 894*c* of the scatter portion 894 may be formed to extend in the upward-downward or vertical direction, and in this embodiment is formed in the vertical direction. The outer surface 894*c* of the scatter portion 894 may connect the upper surface 894*a* and the lower surface 894*b*.

In this embodiment, a protruding length of the scatter portion 894 is 1.5 mm. More specifically, a protruding length of the upper surface 894*a* is 1.5 mm, and a protruding length of the lower surface 894*b* may be longer than that of the upper surface 894*a*. The protruding length of the outer surface 894*c* is 1.5 mm, which is equal to the protruding length of the upper surface 894*a*.

In this embodiment, by minimizing a vertical length of the outer surface 894*c*, a width of the scattered droplets may be minimized. As the protruding length of the scatter portion 894 increases, deformation may occur during rotation, and vibrations may also increase. More particularly, the shield 890 collides with water sprayed from the upper nozzle, such that it is important to minimize vibrations by minimizing the protruding length of the scatter portion 894.

The shield 892 prevents spray lines S3 and S4 from being sprayed upward at a predetermined angle or more. A spray angle of the spray lines S3 and S4 may be slightly changed according to a rotational speed of the humidification housing 800. For example, the spray lines S3 and S4 may be sprayed more horizontally when the humidification housing 800 rotates at a high speed, compared to a case in which the humidification housing 800 rotates at a low speed. Further, when the air blower unit 20 generates a strong air flow, the spray lines 3 and S4 may be changed to be directed upward by the pressure of air flowing from the lower side toward the upper side.

In this embodiment, the shield portions 892 are disposed at a same height, and the first upper nozzle 412 and the second upper nozzle 413 are disposed at different heights. Accordingly, a relative height between the shield 890 and the first upper nozzle 412 is different from a relative height between the shield 890 and the second upper nozzle 413.

In this embodiment, the first upper nozzle 412 is disposed at the same height as or below the shield portion 892, and the second upper nozzle 413 is disposed above the shield portion 892. In this embodiment, the first upper nozzle 412 is disposed at the same height as or below the scatter portion 894, and the second upper nozzle 413 is disposed above the scatter portion 894.

A correlation between the shield 890 and the first upper nozzle 412 will be described hereinafter.

The scatter portion 894 of the shield 890 may be disposed at a same height as or above the first upper nozzle 412. The first upper nozzle 412 may be disposed below the side wall 863. The first upper nozzle 412 may be disposed inside of the shield portion 892. In this embodiment, the height of the scatter portion 894 and the height of the first upper nozzle 412 may overlap each other.

More specifically, the lower surface 894*b* may be located within the height of the first upper nozzle 412. The lower surface 894*b* may be disposed at the same height as that of the first upper nozzle 412, such that exposure of the first upper nozzle 412 may be minimized when seen from a user's point of view. That is, the shield 890 has an effect of hiding the first upper nozzle 412.

Water sprayed from the first upper nozzle 412 forms the spray line S3, comes into contact with the shield 890, and is sprayed to the inner surface of the visual body 210. The water forming the spray line S3 forms a parabola which opens downwards due to self-weight of the water, such that even when the scatter portion 894 of the shield 890 and the first upper nozzle 412 are disposed at the same height, they may not come into contact with each other.

A correlation between the shield 890 and the second upper nozzle 413 will be described hereinafter.

The second upper nozzle 413 may be disposed at a level higher than the first upper nozzle 412. The second upper nozzle 413 and the first upper nozzle 412 may be disposed on opposite sides with respect to the power transmission shaft 640. The second upper nozzle 413 may be disposed inside of the side wall 863. The side wall 863 and the second upper nozzle 413 may face each other and be spaced apart from each other by a predetermined distance in a horizontal direction. The second upper nozzle 413 may be completely hidden by the housing cover 860.

Water, sprayed from the second upper nozzle 413, may be discharged outside of the second housing 840 through the space between the second upper nozzle 413 and the side wall 863. Water discharged through the second upper nozzle 413 may be discharged between the shield 980 and the outer surface of the second housing 840, and then may immediately fall down into the water tank 300. In this case, the scattered water may wet the water tank humidification medium 51. In addition, water discharged through the second upper nozzle 413 may move along the inner surface 893 of the shield 890.

A space between the inner rib 864 and the side wall 863 may be greater than a thickness of the second housing 840, such that a predetermined gap is formed between the second housing 840 and the side wall 863. The gap may be downwardly open.

The inner surface of the second housing 840 may be closely adhered to an outer surface of the inner rib 864. The upper end of the second housing 840 may be disposed above a lower end of the inner rib 864. Accordingly, water sprayed through the second upper nozzle 413 may be sprayed downwardly through the gap between the outer surface of the second housing 840 and the inner surface of the side wall 863. In this case, water sprayed through the gap flows outwardly in a radial direction along the shield portion 892 due to surface tension and centrifugal force occurring during rotation of the humidification housing 800.

More specifically, water sprayed from the second upper nozzle 413 flows outwardly in a radial direction along the inner surface 893 of the shield portion 892, and then are formed as droplets on the scatter portion 894. Then, the water is scattered outwardly in a radial direction from the scatter portion 894 by the centrifugal force occurring during rotation of the humidification housing 800. By minimizing a length of the outer surface 894*c* of the scatter portion 894, a scattering range of the scattered droplets may be minimized.

That is, by adjusting the length of the outer surface 894*c* of the scatter portion 894, a spray range of the spray line S4 may be minimized. By minimizing a scattering range of droplets according to the spray line S4, it is possible to minimize droplets scattered to the upper side of the housing cover 860 and to prevent droplets from being directly scattered to the grill discharge port 231 by wind velocity of the air blower unit 20.

If the droplets pass through the grill discharge port 231 along with air discharged upward, a problem occurs in that the droplets may be scattered into the indoor space. By minimizing a thickness (length of the outer surface) of the scatter portion 894 of the housing cover 860 according to this embodiment, a problem of the scattered droplets, which is caused by strong airflow generated by the air blower unit 20, may be solved easily.

In addition, a space is formed inside of the inner surface 893 of the shield portion 892, such that a predetermined amount of water may be temporarily stored during rotation of the humidification housing 800, and scattering of water sprayed from the second upper nozzle 413 may be delayed by a predetermined period of time. More particularly, an upper end of the inner surface 893 may be formed in a horizontal direction, such that water sprayed from the second upper nozzle 413 may be easily guided to the inside of the shield portion 892. Further, a lower end of the inner surface 893 may be directed downward in a vertical direction, thereby allowing a portion of water flowing into the inside of the shield portion 892 to vertically fall down.

If a centrifugal force is greater than a force in the direction of gravity, water flows to the scatter portion 894, but if a force in the direction of gravity is greater than a centrifugal force, water may fall downwardly from the inner surface 893.

Figure 19:
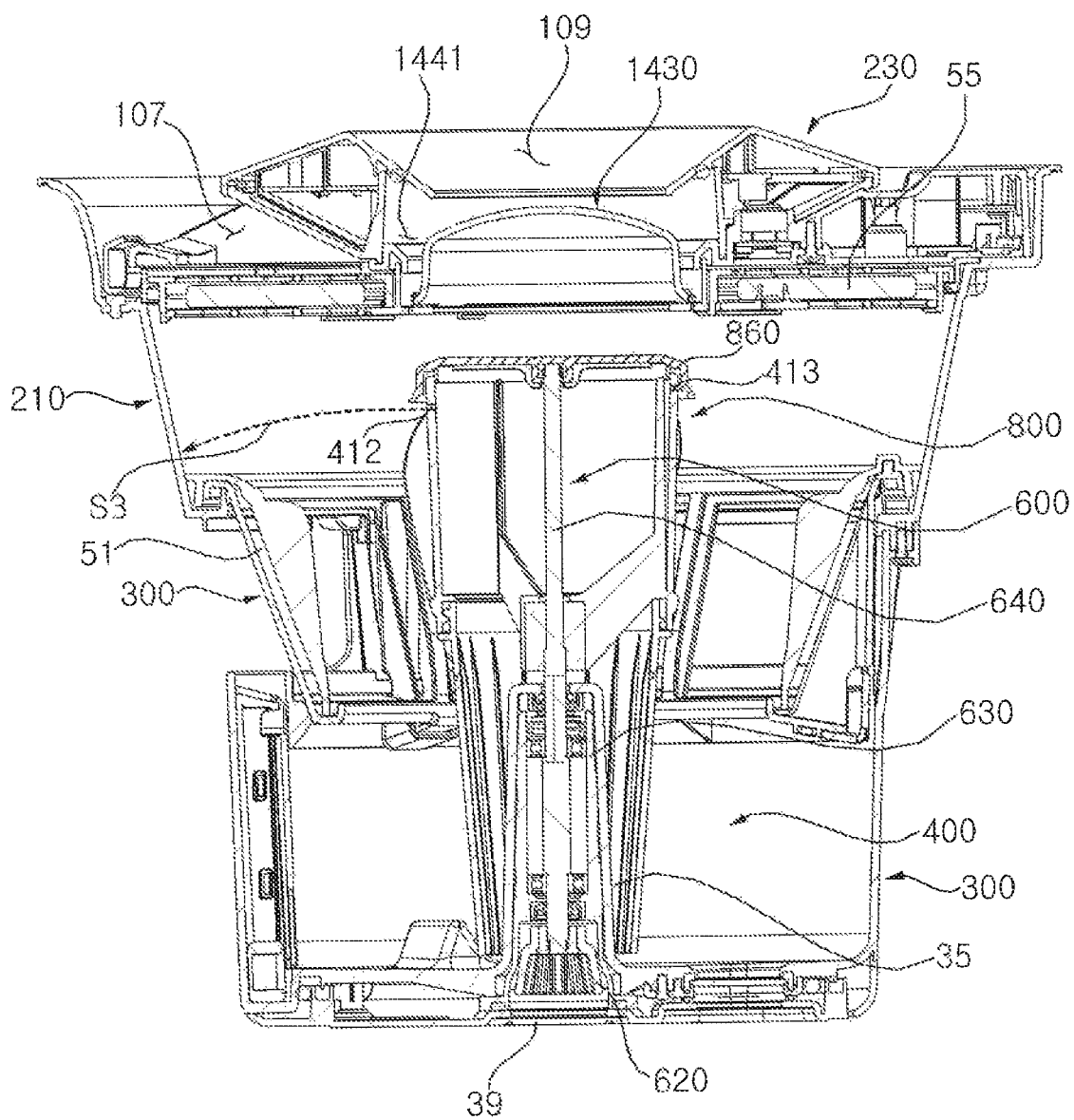
FIG. 19 is an exemplary view of a trajectory of water sprayed through the first upper nozzle.
Figure 20:
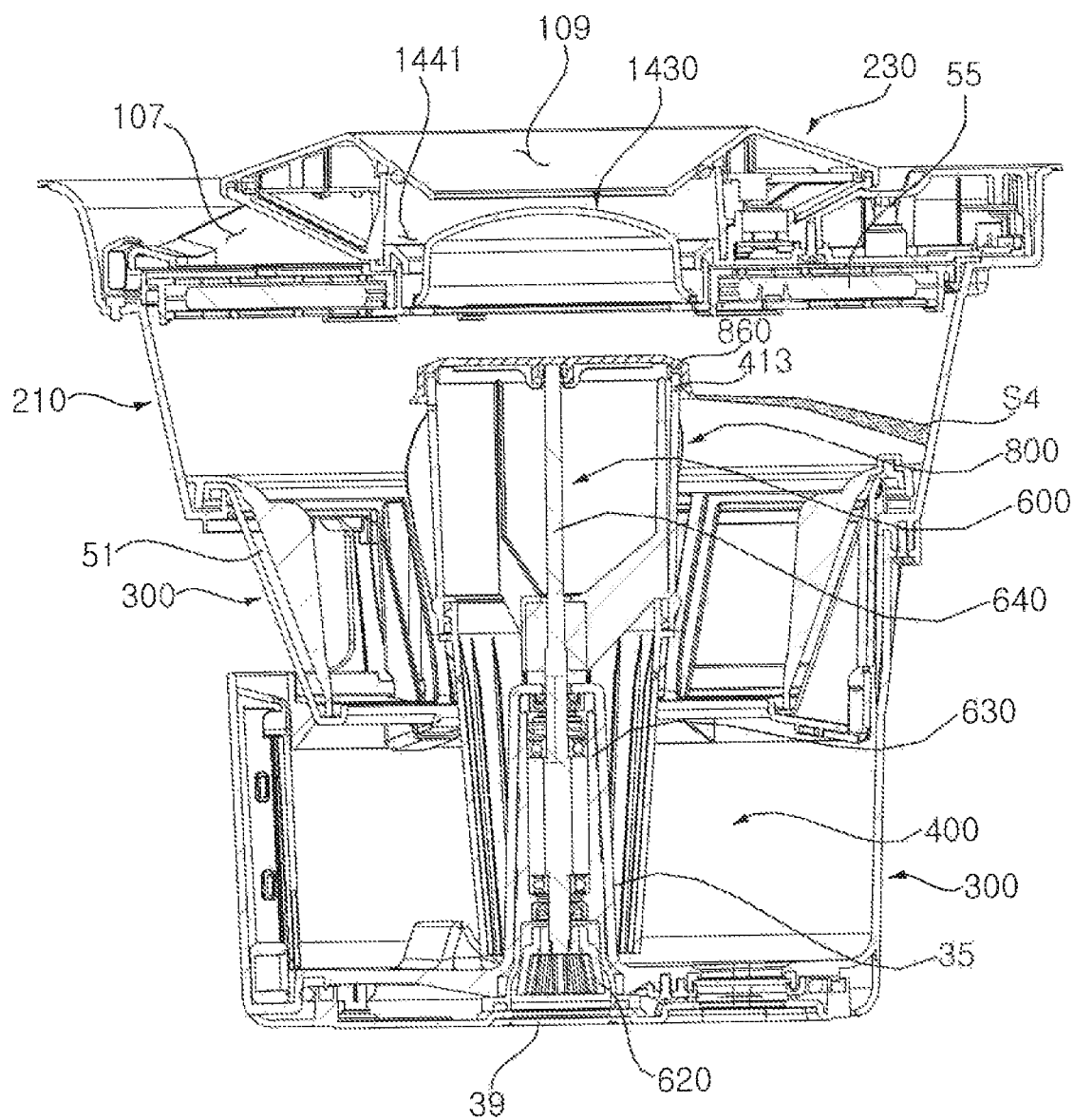
FIG. 20 is an exemplary view of a trajectory of water sprayed through the second upper nozzle.

FIG. 19 is an exemplary view of a trajectory of water sprayed through a first upper nozzle. FIG. 20 is an exemplary view of a trajectory of water sprayed through a second upper nozzle.

A rain view created in the air humidification module 200 will be described hereinafter.

The rain view refers to an effect that looks like raindrops falling outside a window, and an effect that appears as if raindrops are formed. In this embodiment, the rain view creates an effect that looks like raindrops falling inside the visual body 210 or an effect that appears as if raindrops are formed on the inner surface of the visual body 210.

When the rain view is created, various sizes of droplets are formed. The blade 850, the lower nozzle 411, the first upper nozzle 412, the second upper nozzle 413, the housing cover 860, the protrusions 861, and the blower fan 24, which generate the flow of air, may serve as a rain view creating unit for generating droplets.

The lower nozzle 411, the first upper nozzle 412, and the second nozzle 413 are used to spray water pumped by water dispensing unit 400. The rain view may be created with water sprayed from the lower nozzle 411, the first upper nozzle 412, and the second upper nozzle 413.

The housing cover 860 or the protrusions 861 may create a rain view by scattering water which falls when the water is supplied from above.

The sprayed or scattered droplets may be fragmented into smaller droplets by the air pressure or air volume generated by the blower fan 24. The air blown by the air blower unit 20 may pass through the water tank humidification medium 51 to cause the droplets to be further broken up into fine droplets.

The air blown by the air blower unit 20 may cause air falling from the humidification passage 106 to be broken up into fine streams. The air blown by the air blower unit 20 moves in an opposite direction to the direction of gravity, such that the air falling due to self-weight may collide with the falling droplets to be broken into fine streams.

The droplets generated by the rain view creating unit may flow or float along the humidification passage 106. Droplets in the humidification passage 106 may humidify the flowing air, or may be formed on the inner surface of the visual body 210 in the form of water drops. The water drops formed on the inner surface of the visual body 210 may move along a slope of the inner surface of the visual body 210.

The visual body 210 may be inclined toward the water tank 300. The visual body 210 may be wide at top and narrow at bottom, thereby allowing a longer stay time of droplets flowing along the visual body 210, and a longer showing time of the rain view. In addition, the shape of the visual body 210 may inhibit the formed droplets from flowing down the slope of the visual body 210. The droplets may be maintained on the visual body 210 by surface tension of the droplets. In addition, the air flow generated by the air blower unit 20 may inhibit droplets from flowing downward.

Further, the inner surface of the visual body 210 may be coated with a water repellent. Wide spreading of the droplets and formation droplets in a more circular shape may be prevented by the water repellent coating.

When water drops are formed on the visual body 210, the water drops formed on the visual body 210 may be projected onto or reflected from the surface of the display 160. When the water drops formed on the visual body 210 flow down, the same effect is also shown on the display 160.

Actual droplets may move from an upper side to a lower side and from an outer side to an inner side along the slope of the visual body 210. Droplets reflected from the surface of the display 160 may move from a lower side to an upper side and from an outer side to an inner side in opposition to the slope of the display 160. Accordingly, at a boundary where the visual body 210 meets the display 160, actual droplets may join reflected droplets. This joining may allow a user to recognize a rain view more effectively.

Figure 21:
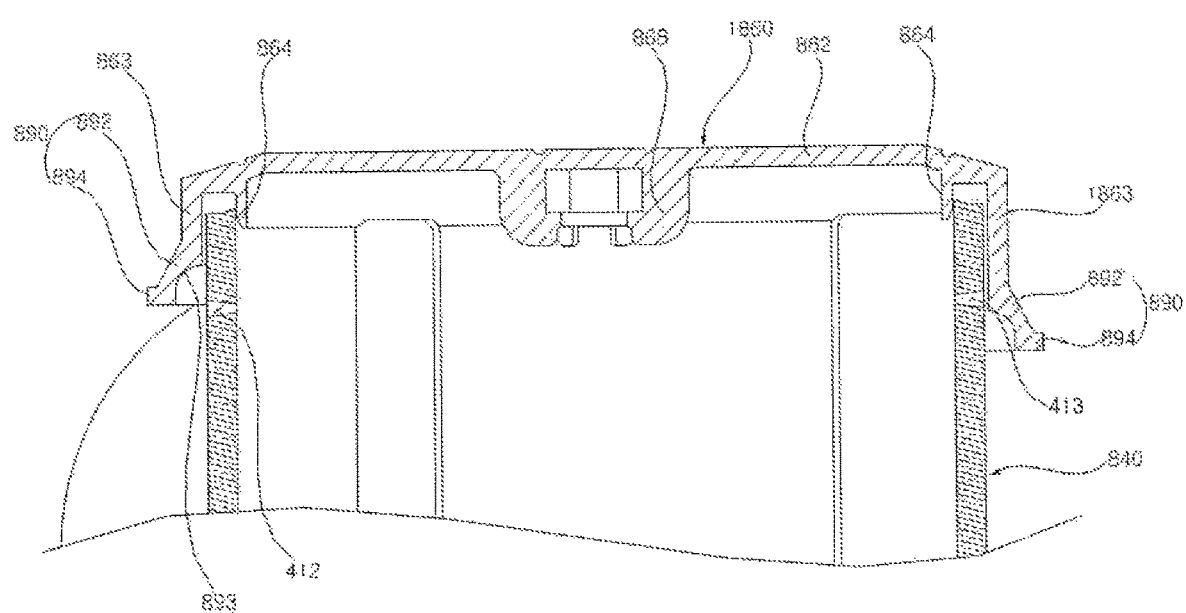
FIG. 21 is a front cross-sectional view of a humidification housing according to another embodiment.

FIG. 21 is a front cross-sectional view of a humidification housing according to another embodiment. In the humidification housing 800 according to this embodiment, the first upper nozzle 412 and the second upper nozzle 413' are disposed at a same height, and a portion of the side wall forming the housing cover 1860 extends downwardly to cover the second upper nozzle 413'.

In this embodiment, as seen in the front cross-sectional view, the housing cover 1860 is bilaterally asymmetrical. Accordingly, a correlation between the first upper nozzle 412 and the shield 890 in this embodiment is the same as the correlation of the previous embodiment. Further, a correlation between the second upper nozzle 413' and a shield 1890 is also the same as the correlation of the previous embodiment.

However, as the first upper nozzle 412 and the second upper nozzle 413' are disposed at the same height, the shield 1890 covering the second upper nozzle 413' is disposed below the shield 890 disposed at the first upper nozzle 412.

In this embodiment, a side wall 1863 that covers the second upper nozzle 413' extends downwardly further than the side wall 863 disposed outside of the first upper nozzle 412. Accordingly, when viewed from the side, the shield 1890 disposed outside of the second upper nozzle 413' is disposed below the shield 890 disposed outside of the first upper nozzle 412.

Other components of this embodiment are the same as those of the previous embodiment, and thus, detailed description thereof has been omitted.

The humidification and air cleaning apparatus according to embodiments has at least one or more of the following advantages.

Firstly, the shield disposed at the housing cover may prevent water, discharged from the upper nozzle, from being scattered upward, thereby preventing droplets from being scattered to the discharge port which is open to the upper side of the water tank. Secondly, as an included angle is formed between the shield portion and the scatter portion of the shield, water may easily flow to the scatter portion.

Thirdly, even when the air blower unit rotates at a high speed generating a strong air flow, droplets may be scattered to the visual body without being directly moved to the discharge port, through which the droplets scattered from the scatter portion are discharged.

Fourthly, the first upper nozzle may be disposed below the second upper nozzle, and the shield may be disposed below the second upper nozzle, such that any one of the spray lines may be scattered with a predetermined width, and a height of the scattered water may be lower than the nozzle. Fifthly, the first upper nozzle and the second upper nozzle may be disposed at the same height, and the shield may be disposed below the second upper nozzle, such that a spray line discharged from the second upper nozzle may be scattered with a predetermined width, and a height of the scattered water may be lower than the nozzle. Sixthly, the side wall may be disposed outside of the second upper nozzle to cover the second upper nozzle, and the side wall and the second upper nozzle may be spaced apart from each other by a predetermined distance, such that the discharged water may be changed into droplets.

Seventhly, the shield may be disposed below the second upper nozzle, such that water discharged from the second upper nozzle may be changed into droplets at the shield. Eighthly, the shield may be disposed at the same height as or above the first upper nozzle and may be disposed below the second upper nozzle, such that a spray line sprayed from the first upper nozzle hits the visual body in the form of a water stream, and the spray line sprayed from the second upper nozzle is changed into droplets, to be scattered with a predetermined width.

Ninthly, the scatter portion protrudes outwardly in a radial direction from the lower end of the shield portion, such that a width of the spray line may be minimized. Tenthly, the scatter portion is disposed below the second upper nozzle, such that a spray direction of the spray line, being changed into droplets, may be guided downwardly, thereby preventing droplets from being directly moved to the discharge port. Eleventhly, the scatter portion is disposed at the same height as or above the first upper nozzle, such that the first upper nozzle, forming the spray line in the form of a water stream, may be hidden.

Embodiments disclosed herein provide a humidification and air cleaning apparatus capable of minimizing scattering of water, sprayed from a humidification housing, to a discharge port disposed at an upper side thereof. Embodiments disclosed herein further provide a humidification and air cleaning apparatus capable of preventing water, sprayed from the housing assembly, from being scattered upward. Embodiments disclosed herein furthermore provide a humidification and air cleaning apparatus, in which when the sprayed water is scattered from the surface of the humidification housing, an area of the scattered water may be narrow in width.

The advantages of embodiments are not limited to the aforementioned advantages and other advantages not described herein will be clearly understood by those skilled in the art from the description.

A shield disposed at the housing cover prevents water, discharged from an upper nozzle, from being scattered upward, thereby preventing droplets from being scattered to a discharge port which is open to the upper side of a water tank. An included angle is formed between a shield portion and a scatter portion of the shield, such that water may easily flow to the scatter portion. Even when an air blower unit rotates at a high speed generating a strong air flow, droplets may be scattered to a visual body without being directly moved to the discharge port, through which the droplets scattered from the scatter portion are discharged.

Embodiments disclosed herein provide a humidification and air cleaning apparatus that may include a housing having an upper opening and a lower opening; a first upper nozzle passing through an inside and an outside of the housing; a second upper nozzle passing through the inside and outside of the housing; a housing cover closing an upper surface of the housing; and a shield disposed at an outer edge of the housing and spaced apart from an outer surface of the housing. The shield may be disposed below either the first upper nozzle or the second upper nozzle.

The first upper nozzle may be disposed below the second upper nozzle, and the shield may be disposed below the second upper nozzle, such that any one of spray lines may be scattered with a predetermined width, and the height of the scattered water may be lower than the nozzle. The first upper nozzle and the second upper nozzle may be disposed at the same height, and the shield may be disposed below the second upper nozzle, such that a spray line discharged from the second upper nozzle may be scattered with a predetermined width, and the height of the scattered water may be lower than the nozzle.

The housing cover may include a top wall that covers the upper opening of the housing, and a side wall that extends downwardly from the top wall and covering an upper end of the housing. The shield may extend downwardly from a lower end of the side wall.

The side wall may be disposed outside of the second upper nozzle to cover the second upper nozzle, and the side wall and the second upper nozzle may be spaced apart from each other by a predetermined distance, such that discharged water may be changed into droplets. The shield may be disposed below the second upper nozzle, such that water discharged from the second upper nozzle may be changed into droplets at the shield.

The shield may be disposed at the same height as or above the first upper nozzle, and may be disposed below the second upper nozzle, such that a spray line, sprayed from the first upper nozzle, may hit a visual body in the form of a water stream, and a spray line, sprayed from the second upper nozzle, may be changed into droplets to be scattered with a predetermined width.

The humidification and air cleaning apparatus may further include an inner rib disposed under the top wall and spaced apart from the side wall by a predetermined distance. The upper end of the housing may be disposed between the inner rib and the side wall. The second upper nozzle may be disposed between a lower end of the inner rib and an upper end of the shield, such that a discharge pressure of water to be supplied to the second upper nozzle may be easily achieved.

The shield may include a shield portion spaced apart from the outer surface of the housing; and a scatter portion that protrudes outwardly in a radial direction from the shield portion. With respect to a rotational axis of the housing, the shield portion may protrude outwardly in a radial direction from the side wall and may be inclined downwardly.

The scatter portion may protrude outwardly in a radial direction from a lower end of the shield portion, such that a width of the spray line may be minimized. The scatter portion may be disposed below the second upper nozzle, such that a spray direction of the spray line, being changed into droplets, may be guided downwardly, thereby preventing the droplets from being directly moved to the discharge port.

The scatter portion may be disposed at the same height as or above the first upper nozzle, such that the first upper nozzle, forming the spray line in the form of a water stream, may be hidden. An outer surface of the shield portion and the scatter portion may form an included angle of greater than 90 degrees and less than 180 degrees.

An inner surface of the shield portion may be open downwardly and toward the rotational axis, such that water supplied to the shield portion may be temporarily stored.

The inner surface of the shield portion may have a rounded shape which is recessed upwardly from a bottom side.

While embodiments have been particularly shown and described with reference to exemplary embodiments thereof, it will be understood by those skilled in the art that embodiments are not limited to those exemplary embodiments and various changes in form and details may be made therein without departing from the scope and spirit as defined by the appended claims and should not be individually understood from the technical spirit or prospect.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles. More particularly, various variations and modifications are possible in the component parts and/or arrangements of the subject combination arrangement within the scope, the drawings and the appended claims. In addition to variations and modifications in the component parts and/or arrangements, alternative uses will also be apparent to those skilled in the art.

What is claimed is:

1. A humidification and air cleaning apparatus, comprising:
   a humidification housing having an upper opening and a lower opening;
   a first upper nozzle that passes through the humidification housing;
   a second upper nozzle that passes through the humidification housing;
   a housing cover that closes an upper surface of the humidification housing; and
   a shield disposed at an outer edge of the housing cover and spaced apart from an outer surface of the humidification housing, wherein the shield is disposed below either the first upper nozzle or the second upper nozzle.

2. The apparatus of claim 1, wherein the first upper nozzle is disposed below the second upper nozzle, and the shield is disposed below the second upper nozzle.

3. The apparatus of claim 1, wherein the first upper nozzle and the second upper nozzle are disposed at a same height, and the shield is disposed below the second upper nozzle.

4. The apparatus of claim 1, wherein the housing cover comprises a top wall that covers the upper opening of the humidification housing, and a side wall that extends downwardly from the top wall and covers an upper end of the humidification housing, wherein the shield extends downwardly from a lower end of the side wall.

5. The apparatus of claim 4, wherein the side wall is disposed outside of the second upper nozzle to cover the second upper nozzle, and wherein the side wall and the second upper nozzle are spaced apart from each other by a predetermined distance.

6. The apparatus of claim 4, wherein the shield is disposed below the second upper nozzle.

7. The apparatus of claim 4, wherein the shield is disposed at a same height as or above the first upper nozzle and below the second upper nozzle.

8. The apparatus of claim 4, further comprising an inner rib disposed under the top wall and spaced apart from the side wall by a predetermined distance, wherein the upper end of the humidification housing is disposed between the inner rib and the side wall.

9. The apparatus of claim 8, wherein the second upper nozzle is disposed between a lower end of the inner rib and an upper end of the shield.

10. The apparatus of claim 4, wherein the shield comprises:
   a shield portion spaced apart from the outer surface of the humidification housing; and
   a scatter portion that protrudes outwardly in a radial direction from the shield portion, wherein the shield portion protrudes outwardly in the radial direction from the side wall with respect to a rotational axis of the humidification housing and is inclined downwardly.

11. The apparatus of claim 10, wherein the scatter portion protrudes outwardly in the radial direction from a lower end of the shield portion.

12. The apparatus of claim 10, wherein the scatter portion is disposed below the second upper nozzle.

13. The apparatus of claim 10, wherein the scatter portion is disposed at a same height as or above the first upper nozzle.

14. The apparatus of claim 10, wherein an outer surface of the shield portion and the scatter portion form an included angle of greater than 90 degrees and less than 180 degrees.

15. The apparatus of claim 10, wherein an inner surface of the shield portion is open downwardly and toward the rotational axis.

16. The apparatus of claim 10, wherein the inner surface of the shield portion has a rounded shape which is recessed upwardly from a bottom side.

17. A humidification and air cleaning apparatus, comprising:
   a humidification housing having an upper opening and a lower opening;
   a first upper nozzle that passes through the humidification housing;
   a second upper nozzle that passes through the humidification housing;
   a housing cover that closes at least the upper opening of the humidification housing; and
   a shield disposed outside of the upper opening of the humidification housing, wherein the shield is disposed below either the first upper nozzle or the second upper nozzle, and wherein the shield is disposed to surround an upper end of humidification housing.

18. The apparatus of claim 17, wherein the first upper nozzle is disposed below the second upper nozzle, and the shield is disposed below the second upper nozzle.

19. The apparatus of claim 17, wherein the first upper nozzle and the second upper nozzle are disposed at a same height, and the shield is disposed below the second upper nozzle.

20. The apparatus of claim 17, wherein the humidification housing cover comprises a top wall that covers the upper opening of the humidification housing, and a side wall that extends downwardly from the top wall and covers an upper end of the humidification housing, wherein the shield extends downwardly from a lower end of the side wall.

* * * * *